(12) United States Patent
Enkhtaivan et al.

(10) Patent No.: US 12,267,411 B2
(45) Date of Patent: Apr. 1, 2025

(54) DATA DELIVERY APPARATUS AND METHOD, DATA REQUESTING APPARATUS AND METHOD, DATA DELIVERY SYSTEM, AND COMPUTER READABLE MEDIUM

(71) Applicant: NEC Corporation, Tokyo (JP)

(72) Inventors: Batnyam Enkhtaivan, Tokyo (JP); Pooja Dhomse, Tokyo (JP)

(73) Assignee: NEC CORPORATION, Tokyo (JP)

( * ) Notice: Subject to any disclaimer, the term of this patent is extended or adjusted under 35 U.S.C. 154(b) by 559 days.

(21) Appl. No.: 17/628,281

(22) PCT Filed: Jul. 31, 2019

(86) PCT No.: PCT/JP2019/030060
§ 371 (c)(1),
(2) Date: Jan. 19, 2022

(87) PCT Pub. No.: WO2021/019738
PCT Pub. Date: Feb. 4, 2021

(65) Prior Publication Data
US 2022/0271923 A1 Aug. 25, 2022

(51) Int. Cl.
*H04L 9/08* (2006.01)
*H04L 9/14* (2006.01)
(Continued)

(52) U.S. Cl.
CPC .............. *H04L 9/0825* (2013.01); *H04L 9/14* (2013.01); *H04L 9/3242* (2013.01); *H04L 9/3247* (2013.01); *H04L 9/50* (2022.05)

(58) Field of Classification Search
None
See application file for complete search history.

(56) References Cited

U.S. PATENT DOCUMENTS

2002/0094090 A1* 7/2002 Iino .................... G11B 20/00811
380/282
2003/0018896 A1* 1/2003 Aoshima ............... H04L 67/568
713/181
(Continued)

FOREIGN PATENT DOCUMENTS

CN 101808092 A * 8/2010
JP H11-095660 A 4/1999
(Continued)

OTHER PUBLICATIONS

GeonLyang Kim, JaeDeok Lim and JeongNyeo Kim; (Secure user authentication based on the trusted platform for mobile devices); pp. 15; (Year: 2016).*

(Continued)

*Primary Examiner* — Cheng-Feng Huang
*Assistant Examiner* — Ali H. Cheema

(57) ABSTRACT

An apparatus publishes the first verification key generated in a first secure area outside the apparatus, acquires a second verification key that is generated in a second secure area of a data requesting apparatus and published by the data requesting apparatus, signs, in the first secure area, in response to a data delivery request, delivery target data using the first signature key, transmits transmission data obtained through the signing to the data requesting apparatus, receives certification data from the data requesting apparatus, verifies a signature of the certification data using the second verification key, and transmits, when the signature of the certification data is successfully verified using the second verification key, the certification data to the data providing apparatus.

18 Claims, 11 Drawing Sheets

(51) Int. Cl.
*H04L 9/32* (2006.01)
*H04L 9/00* (2022.01)

(56) References Cited

U.S. PATENT DOCUMENTS

| | | | | |
|---|---|---|---|---|
| 2006/0095771 | A1* | 5/2006 | Appenzeller | H04L 9/3247 |
| | | | | 713/171 |
| 2006/0168357 | A1* | 7/2006 | Nakano | H04L 9/3268 |
| | | | | 710/1 |
| 2011/0047373 | A1* | 2/2011 | Karasawa | H04L 9/3268 |
| | | | | 713/155 |
| 2013/0246281 | A1* | 9/2013 | Yamada | H04L 9/3231 |
| | | | | 705/71 |
| 2014/0237614 | A1* | 8/2014 | Irvine | H04L 63/083 |
| | | | | 726/26 |
| 2017/0141926 | A1* | 5/2017 | Xu | H04L 9/3066 |
| 2019/0386975 | A1* | 12/2019 | Li | H04L 63/08 |
| 2020/0076617 | A1* | 3/2020 | Borne-Pons | H04L 9/0841 |
| 2020/0344072 | A1* | 10/2020 | Yan | H04L 9/3231 |
| 2021/0111900 | A1 | 4/2021 | Inokuchi | |

FOREIGN PATENT DOCUMENTS

| | | | | |
|---|---|---|---|---|
| JP | 2001-189723 | A | 7/2001 | |
| JP | 2010152704 | A * | 7/2010 | G06F 8/63 |
| JP | 2017-204182 | A | 11/2017 | |
| JP | 2018-113504 | A | 7/2018 | |
| KR | 20200088180 | A * | 7/2020 | H04L 9/0825 |
| WO | 2018/179293 | A1 | 10/2018 | |

OTHER PUBLICATIONS

International Search Report for PCT Application No. PCT/JP2019/030060, mailed on Nov. 5, 2019.

* cited by examiner

DATA DELIVERY APPARATUS AND METHOD, DATA REQUESTING APPARATUS AND METHOD, DATA DELIVERY SYSTEM, AND COMPUTER READABLE MEDIUM

This application is a National Stage Entry of PCT/JP2019/030060 filed on Jul. 31, 2019, the contents of all of which are incorporated herein by reference, in their entirety.

TECHNICAL FIELD

The present disclosure relates to a data delivery apparatus and method, a data requesting apparatus and method, a data delivery system, and a computer readable medium.

BACKGROUND ART

The use of a data distribution platform (DDP) specializing in data delivery to deliver data such as advertisements using electronic data has increased in recent years. The data distribution platform generally charges a data owner who is an advertiser according to the amount of data delivered. Thus, it is important for a data distribution platform to prove that the data distribution platform has actually transmitted data and that an end user who is the destination of the data transmission has actually received the data.

Patent Literature 1 discloses a technique relating to an apparatus for providing verification information for determining the validity of data.

CITATION LIST

Patent Literature

Patent Literature 1: International Patent Publication No. WO2018/179293

SUMMARY OF INVENTION

Technical Problem

Here, such data delivery has a problem in that, if the data distribution platform and the end user collude, illegal value transfer such as illegal payment of money from the data owner may occur, causing damage to the data owner. This is because of deficiencies in the mechanisms up to now for verifying that specific data has been transmitted from the data distribution platform to the end user.

The present disclosure has been made to solve such problems and it is an object of the present disclosure to provide a data delivery apparatus and method, a data requesting apparatus and method, a data delivery system, and a computer readable medium that can improve the reliability of data delivery.

Solution to Problem

A data delivery apparatus according to a first aspect of the present disclosure includes a key generation means for generating a pair of a first signature key and a first verification key in a first secure area of the data delivery apparatus, an output means for outputting the first verification key to an area outside the first secure area in the data delivery apparatus, a publishing means for publishing the output first verification key outside the data delivery apparatus, an acquiring means for acquiring a second verification key that is published out of a pair of a second signature key and the second verification key generated in a second secure area of a data requesting apparatus, a signing means for signing, in the first secure area, in response to a data delivery request from the data requesting apparatus, processing target data using the first signature key, the processing target data including at least part of delivery target data provided by a data providing apparatus, a first transmitting means for transmitting transmission data obtained through the signing to the data requesting apparatus, a receiving means for receiving, when the signature of the transmission data is successfully verified using the first verification key in the data requesting apparatus, certification data from the data requesting apparatus, the certification data being obtained by signing, in the second secure area, a verification result by using the second signature key, the verification result including identification information for identifying the processing target data, a verification means for verifying a signature of the certification data using the second verification key, and a second transmitting means for transmitting, when the signature of the certification data is successfully verified using the second verification key, the certification data to the data providing apparatus.

A data requesting apparatus according to a second aspect of the present disclosure includes an acquiring means for acquiring a first verification key that is published out of a pair of a first signature key and the first verification key generated in a first secure area of a data delivery apparatus, a key generation means for generating a pair of a second signature key and a second verification key in a second secure area of the data requesting apparatus, an output means for outputting the second verification key to an area outside the second secure area in the data requesting apparatus, a publishing means for publishing the output second verification key outside, a requesting means for requesting the data delivery apparatus to deliver delivery target data provided by a data providing apparatus, a receiving means for receiving, from the data delivery apparatus, transmission data obtained by signing, in the first secure area, processing target data using the first signature key in the data delivery apparatus, the processing target data including at least part of the delivery target data, a verification means for verifying a signature of the transmission data using the first verification key, a signing means for signing, in the second secure area, when the signature of the transmission data is successfully verified using the first verification key, a verification result using the second signature key, the verification result including identification information for identifying the processing target data, and a transmitting means for transmitting certification data obtained through the signing to the data delivery apparatus.

A data delivery system according to a third aspect of the present disclosure includes a data delivery apparatus having a first secure area, a data requesting apparatus having a second secure area, and a data providing apparatus for providing delivery target data to the data delivery apparatus, wherein the data delivery apparatus generates a pair of a first signature key and a first verification key in the first secure area and outputs the first verification key to an area outside the first secure area to publish the first verification key outside the data delivery apparatus, the data requesting apparatus generates a pair of a second signature key and a second verification key in the second secure area and outputs the second verification key to an area outside the second secure area to publish the second verification key outside the data requesting apparatus, the data delivery apparatus signs, in the first secure area, in response to a data delivery request from the data requesting apparatus, processing target data including at least part of the delivery target data using the first signature key and transmits transmission data obtained through the signing to the data requesting apparatus, the data requesting apparatus signs, in the second secure area, when the signature of the transmission data received from the data delivery apparatus is successfully verified using the first verification key, a verification result including identification information for identifying the processing target data using the second signature key and transmits certification data obtained through the signing to the data delivery apparatus, and the data delivery apparatus transmits, when the signature of the certification data received from the data requesting apparatus is successfully verified using the second verification key, the certification data to the data providing apparatus.

A data delivery method according to a fourth aspect of the present disclosure includes, by a computer, generating a pair of a first signature key and a first verification key in a first secure area of the computer, outputting the first verification key to an area outside the first secure area in the computer, publishing the output first verification key outside the computer, acquiring a second verification key that is published out of a pair of a second signature key and the second verification key generated in a second secure area of a data requesting apparatus, signing, in the first secure area, in response to a data delivery request from the data requesting apparatus, processing target data including at least part of delivery target data provided by a data providing apparatus using the first signature key, transmitting transmission data obtained through the signing to the data requesting apparatus, receiving, when the signature of the transmission data is successfully verified using the first verification key in the data requesting apparatus, certification data from the data requesting apparatus, the certification data being obtained by signing, in the second secure area, a verification result including identification information for identifying the processing target data using the second signature key, verifying a signature of the certification data using the second verification key, and transmitting, when the signature of the certification data is successfully verified using the second verification key, the certification data to the data providing apparatus.

A computer readable medium according to a fifth aspect of the present disclosure is a non-transitory computer readable medium storing a program causing a computer to execute generating a pair of a first signature key and a first verification key in a first secure area of the computer, outputting the first verification key to an area outside the first secure area to publish the first verification key, encrypting, in response to a data delivery request from a data requesting apparatus, processing target data in the first secure area using an encryption key to obtain encrypted data, the processing target data including at least part of delivery target data provided by a data providing apparatus, and the encryption key being generated as an encryption key for data communication in a second secure area of the data requesting apparatus and being input, signing, in the first secure area, the encrypted data using the first signature key while using a second verification key that is published out of a pair of a second signature key and the second verification key generated in the second secure area of the data requesting apparatus, and outputting the signed encrypted data to an area outside the first secure area as transmission data to the data requesting apparatus.

A data requesting method according to a sixth aspect of the present disclosure includes, by a computer, acquiring a first verification key that is published out of a pair of a first signature key and the first verification key generated in a first secure area of a data delivery apparatus, generating a pair of a second signature key and a second verification key in a second secure area of the computer, outputting the second verification key to an area outside the second secure area in the computer, publishing the output second verification key outside the computer, requesting the data delivery apparatus to deliver delivery target data provided by a data providing apparatus, receiving, from the data delivery apparatus, transmission data obtained by signing, in the first secure area in the data delivery apparatus, processing target data by using the first signature key, the processing target data including at least part of the delivery target data, verifying a signature of the transmission data using the first verification key, signing, in the second secure area, when the signature of the transmission data is successfully verified using the first verification key, a verification result including identification information for identifying the processing target data using the second signature key, and transmitting certification data obtained through the signing to the data delivery apparatus.

A computer readable medium according to a seventh aspect of the present disclosure is a non-transitory computer readable medium storing a program causing a computer to execute generating a pair of a second signature key and a second verification key in a second secure area of the computer, outputting the second verification key to an area outside the second secure area to publish the second verification key, generating an encryption key for data communication in the second secure area, outputting the encryption key to an area outside the second secure area to transmit the encryption key to a data delivery apparatus, decrypting, when the signature of received data that is received from the data delivery apparatus is successfully verified using a first verification key that is published out of a pair of a first signature key and the first verification key generated in a first secure area of the data delivery apparatus, encrypted data included in the received data using a key based on the encryption key in the second secure area, signing, in the second secure area, a verification result including identification information for identifying decrypted data obtained through the decryption using the second signature key, and outputting certification data obtained through the signing to an area outside the second secure area as reply data to the data delivery apparatus.

Advantageous Effects of Invention

According to the above aspects, it is possible to provide a data delivery apparatus and method, a data requesting apparatus and method, a data delivery system, and a computer readable medium for improving the reliability of data delivery.

DESCRIPTION OF EMBODIMENTS

Hereinafter, example embodiments of the present disclosure will be described in detail with reference to the drawings. In each drawing, the same or corresponding elements are denoted by the same reference signs and duplicate explanations are omitted as necessary for the sake of clarity of explanation.

First Example Embodiment

Figure 1:
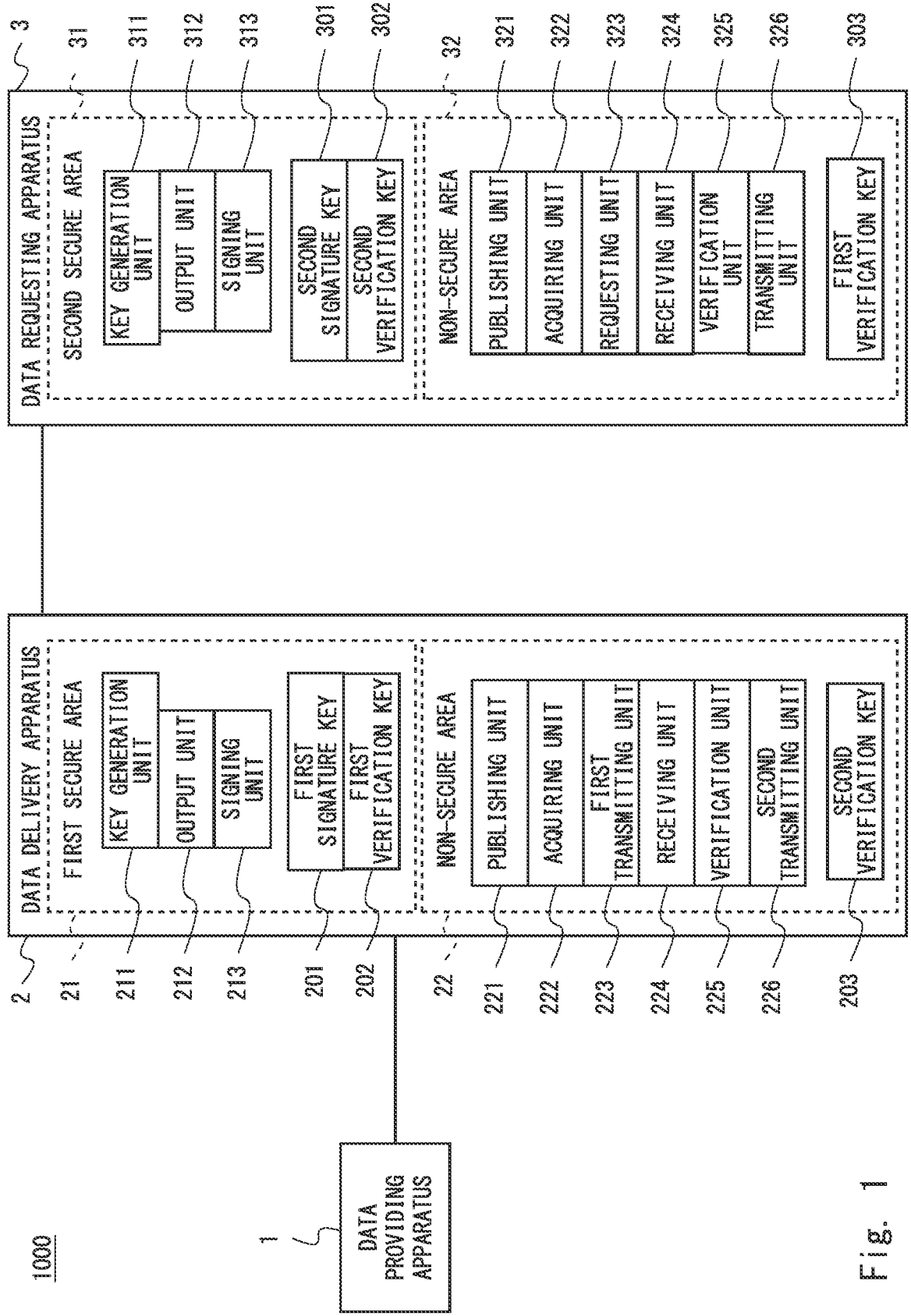
FIG. 1 is a block diagram illustrating an overall configuration of a data delivery system according to a first example embodiment.

FIG. 1 is a block diagram illustrating an overall configuration of a data delivery system 1000 according to a first example embodiment. The data delivery system 1000 includes a data providing apparatus 1, a data delivery apparatus 2, and a data requesting apparatus 3. The data providing apparatus 1 provides delivery target data to the data delivery apparatus 2 and requests the data delivery apparatus 2 to deliver delivery target data to a requester requesting the delivery of the delivery target data. Here, examples of the delivery target data include, but not limited to, advertisement data. The data providing apparatus 1 is, for example, an information processing apparatus that is operated by a data owner who is an advertiser of the delivery target data.

The data delivery apparatus 2 is an information processing apparatus that has a first secure area 21 in the apparatus. The data delivery apparatus 2 is, for example, an information system that implements a data distribution platform (DDP). The first secure area 21 is a trusted execution environment (TEE) that is physically or logically separated from a non-secure area 22. The first secure area 21 has a memory (not illustrated) whose access from a main process in the non-secure area 22 is restricted and securely holds a secure program and various key information according to the present example embodiment. Thus, the first secure area 21 is a TEE that is a more secure execution environment than the non-secure area 22 in the data delivery apparatus 2. Here, the first secure area 21 can be implemented by technical specifications typified by TrustZone of the ARM architecture, Intel SGX, or the like.

The data delivery apparatus 2 includes a key generation unit 211, an output unit 212, a signing unit 213, a publishing unit 221 and an acquiring unit 222, a first transmitting unit 223, a receiving unit 224, a verification unit 225, and a second transmitting unit 226. Here, the key generation unit 211, the output unit 212, and the signing unit 213 are components that operate in the first secure area 21. The data delivery apparatus 2 holds a first signature key 201 and a first verification key 202 in a memory (not illustrated) in the first secure area 21 and holds a second verification key 203 in a memory (not illustrated) in the non-secure area 22. Thus, the first signature key 201 and the first verification key 202 cannot be directly read or overwritten from the non-secure area 22. The second verification key 203 may also be held in the memory in the first secure area 21.

The key generation unit 211 generates a pair of the first signature key 201 and the first verification key 202 in the first secure area 21. The first signature key 201 is key information for digitally signing predetermined data and is a private key. The first verification key 202 is key information for verifying a signature made by the first signature key 201 and is a public key. Thus, the first signature key 201 and the first verification key 202 correspond to each other.

The output unit 212 outputs the first verification key 202 to an area (the non-secure area 22) outside the first secure area 21 in the apparatus. The first signature key 201 is not output to the non-secure area 22.

The publishing unit 221 publishes the first verification key 202 output by the output unit 212 outside the data delivery apparatus 2. Here, "publishing" is, for example, setting a specific storage area in the data delivery apparatus 2 such that it is accessible from outside the data delivery apparatus 2 and storing the first verification key 202 in the storage area. Alternatively, "publishing" is, for example, uploading the first verification key 202 to a file server accessible from any computer on the network. Thus, the data providing apparatus 1 and the data requesting apparatus 3 can acquire the first verification key 202. Alternatively, the publishing unit 221 may transmit the first verification key 202 to at least the data requesting apparatus 3. In the present example embodiment, the first verification key 303 in the data requesting apparatus 3 and the first verification key 202 in the data delivery apparatus 2 are the same key information.

The acquiring unit 222 acquires the published second verification key 302, out of the pair of the second signature key 301 and the second verification key 302 generated in the second secure area 31 of the data requesting apparatus 3, as the second verification key 203. That is, in the present example embodiment, the second verification key 302 in the data requesting apparatus 3 and the second verification key 203 in the data delivery apparatus 2 are the same key information.

In response to a data delivery request from the data requesting apparatus 3, the signing unit 213 signs processing target data including at least part of the delivery target data using the first signature key 201 in the first secure area 21. Data including identification information for identifying the processing target data, in addition to the processing target data, may be signed. Here, the "identification information" is identification information of the processing target data, a hash value of the processing target data, information for identifying its position in the delivery target data, or the like. Data including identification information of the delivery target data, in addition to the processing target data, may be signed. The identification information of the delivery target data may be used as the identification information.

The first transmitting unit 223 transmits transmission data obtained through the signing to the data requesting apparatus 3. The transmission data includes at least the identification information described above. The receiving unit 224 receives certification data that will be described later from the data requesting apparatus 3. The verification unit 225 verifies the signature of the received certification data using the second verification key 203. When the signature of the certification data is successfully verified using the second verification key 203, the second transmitting unit 226 transmits the certification data to the data providing apparatus 1.

The data requesting apparatus 3 is an information processing apparatus having a second secure area 31 in the apparatus. The data requesting apparatus 3 is, for example, a terminal that is operated by an end user who acquires delivery target data owned by the data providing apparatus 1 via the data delivery apparatus 2. The second secure area 31 is a TEE that is physically or logically separated from a non-secure area 32. Thus, the second secure area 31 is a TEE that is a more secure execution environment than the non-secure area 32 in the data requesting apparatus 3. Here, the second secure area 31 can be implemented by a TEE in the same manner as the first secure area 21 described above.

The data requesting apparatus 3 includes a key generation unit 311, an output unit 312, a signing unit 313, a publishing unit 321, an acquiring unit 322, a requesting unit 323, a receiving unit 324, a verification unit 325, and a transmitting unit 326. Here, the key generation unit 311, the output unit 312, and the signing unit 313 are configured to operate in the second secure area 31. The data requesting apparatus 3 holds the second signature key 301 and the second verification key 302 in a memory (not illustrated) in the second secure area 31 and holds the first verification key 303 in a memory (not illustrated) in the non-secure area 32. Thus, the second signature key 301 and the second verification key 302 cannot be directly read or overwritten from the non-secure area 32. The first verification key 303 may also be held in the memory in the second secure area 31.

The key generation unit 311 generates a pair of the second signature key 301 and the second verification key 302 in the second secure area 31. The second signature key 301 is key information for digitally signing predetermined data and is a private key. The second verification key 302 is key information for verifying a signature made by the second signature key 301 and is a public key. Thus, the second signature key 301 and the second verification key 302 correspond to each other.

The output unit 312 outputs the second verification key 302 to an area (the non-secure area 32) outside the second secure area 31 in the apparatus. The second signature key 301 is not output to the non-secure area 32.

The publishing unit 321 publishes the second verification key 302 output by the output unit 312 outside the data requesting apparatus 3. Here, "publishing" is, for example, configuring a specific storage area in the data requesting apparatus 3 to be accessible from outside the data requesting apparatus 3 and storing the second verification key 302 in the storage area. Alternatively, "publishing" is, for example, uploading the second verification key 302 to a file server accessible from any computer on the network. Alternatively, the publishing unit 321 may transmit the second verification key 302 to the data providing apparatus 1 or the data delivery apparatus 2. Thus, the data providing apparatus 1 and the data delivery apparatus 2 can acquire the second verification key 302.

The acquiring unit 322 acquires the published first verification key 202, out of the pair of the first signature key 201 and the first verification key 202 generated in the first secure area 21 of the data delivery apparatus 2, as the first verification key 303.

The requesting unit 323 requests the data delivery apparatus 2 to deliver delivery target data. The receiving unit 324 receives the transmission data obtained through the signing of the signing unit 213 described above from the data delivery apparatus 2. The verification unit 325 verifies the signature of the transmission data using the first verification key 303. The signing unit 313 signs a verification result including the identification information for identifying the processing target data (included in the transmission data) using the second signature key 301 in the second secure area 31 when the signature of the transmission data is successfully verified using the first verification key 303. The transmitting unit 326 transmits certification data obtained through the signing to the data delivery apparatus 2. That is, the "certification data" is data obtained by signing the verification result including the identification information for identifying the processing target data using the second signature key 301 in the second secure area 31 when the signature of the transmission data is successfully verified using the first verification key 303 in the data requesting apparatus 3.

Figure 2:
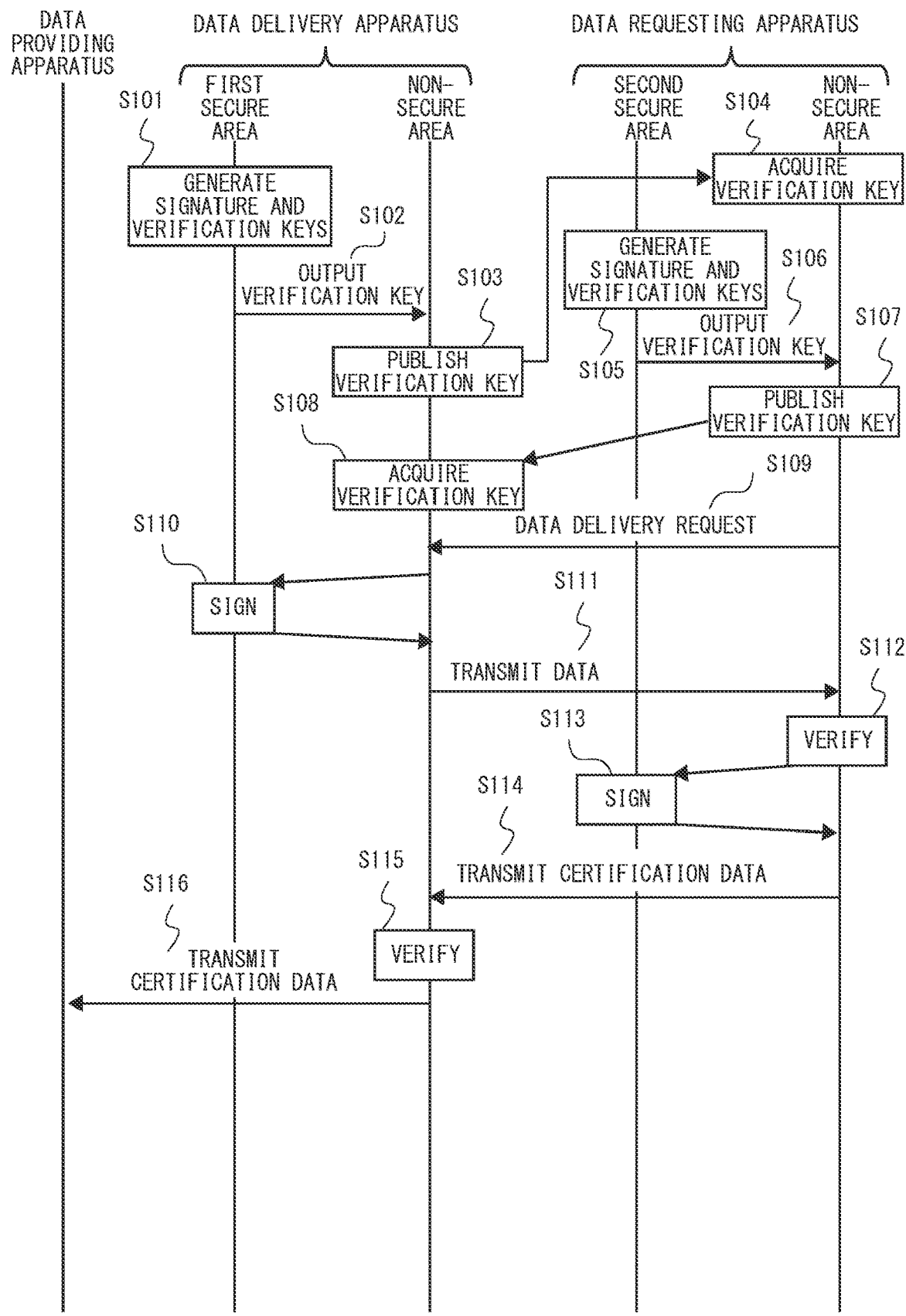
FIG. 2 is a sequence diagram illustrating a series of steps of a data delivery method according to the first example embodiment.

FIG. 2 is a sequence diagram illustrating a series of steps of a data delivery method according to the first example embodiment. As a premise, it is assumed that the data delivery apparatus 2 has received delivery target data provided by the data providing apparatus 1 and the delivery target data has been stored in a storage device (not illustrated) accessible from the data delivery apparatus 2.

First, the key generation unit 211 of the data delivery apparatus 2 generates a pair of a first signature key 201 and a first verification key 202 in the first secure area 21 (S101). Next, the output unit 212 outputs the first verification key 202 to the non-secure area 22 (S102). Then, the publishing unit 221 publishes the output first verification key 202 outside the data delivery apparatus 2 (S103). In response to this, the acquiring unit 322 of the data requesting apparatus 3 acquires the published first verification key 202 (S104) and holds the published first verification key 202 internally as a first verification key 303.

The key generation unit 311 of the data requesting apparatus 3 generates a pair of a second signature key 301 and a second verification key 302 in the second secure area 31 (S105). Next, the output unit 312 outputs the second verification key 302 to the non-secure area 32 (S106). Then, the publishing unit 321 publishes the output second verification key 302 outside the data requesting apparatus 3 (S107). In response to this, the acquiring unit 222 of the data delivery apparatus 2 acquires the published second verification key 302 (S108) and holds the published second verification key 302 internally as a second verification key 203. Here, step S104 is executed before step S109.

Subsequently, the requesting unit 323 of the data requesting apparatus 3 requests the data delivery apparatus 2 to deliver delivery target data (S109). For example, the requesting unit 323 transmits to the data delivery apparatus 2 a delivery request in which delivery target data is specified.

Next, upon receiving the data delivery request from the data requesting apparatus 3, the data delivery apparatus 2 notifies the signing unit 213 of the reception. Then, the signing unit 213 signs processing target data including at least part of the delivery target data using the first signature key 201 in the first secure area 21 (S110). Then, the first transmitting unit 223 transmits the signed data to the data requesting apparatus as transmission data (S111).

In response to this, the receiving unit 324 of the data requesting apparatus 3 receives the transmission data from the data delivery apparatus 2. Then, the verification unit 325 verifies the signature of the transmission data using the first verification key 303 (S112). When the signature of the transmission data is successfully verified using the first verification key 303, the signing unit 313 signs a verification result including identification information for identifying the processing target data using the second signature key 301 in the second secure area 31 (S113).

Then, the transmitting unit 326 transmits the signed data to the data delivery apparatus 2 as certification data (S114). In response to this, the receiving unit 224 of the data delivery apparatus 2 receives the certification data from the data requesting apparatus 3. Then, the verification unit 225 verifies the signature of the certification data using the second verification key 203 (S115). When the signature of the certification data is successfully verified using the second verification key 203, the second transmitting unit 226 transmits the certification data to the data providing apparatus 1 (S116).

Thus, the data providing apparatus 1 can verify the signature of the certification data received from the data delivery apparatus 2 using the second verification key 203. Then, when the signature of the certification data is successfully verified, the data providing apparatus 1 can also remit a predetermined amount of money to the data delivery apparatus 2.

In the present example embodiment, data signed in a secure area in each of the data delivery apparatus 2 and the data requesting apparatus 3 is transmitted to the other and the signature of data received by the other party is verified using a verification key of the apparatus that has transmitted the data as described above. Here, because each of the data delivery apparatus 2 and the data requesting apparatus 3 performs signature in a secure area using a signature key generated in the secure area, even a main process of each apparatus cannot alter the signature of the apparatus itself. Further, because an output unit operating in the secure area is used to output a verification key corresponding to the signature key out of the area, the verification key can be acquired by the other party.

Then, the data delivery apparatus 2 receives certification data from the data requesting apparatus 3 as reply data to transmission data transmitted in response to a delivery request, and when the certification data has been verified, transfers the certification data to the data providing apparatus 1. Because the data providing apparatus 1 can also acquire the verification key (the second verification key 302) of the data requesting apparatus 3, the data providing apparatus 1 can verify the certification data. Further, by including identification information for identifying the processing target data in the certification data, it is possible to guarantee that at least part of the delivery target data has been transmitted from the data delivery apparatus 2 to the data requesting apparatus 3.

The data delivery apparatus 2 is configured to include a processor, a memory, and another storage device in each of the first secure area 21 and the non-secure area 22, which are not illustrated. The other storage device stores a secure program according to the present example embodiment and a computer program in which the data delivery process is implemented. Then, the processor in the first secure area 21 loads the secure program into the memory in the first secure area 21 and executes the computer program. Thus, the processor in the first secure area 21 of the data delivery apparatus 2 implements the functions of the key generation unit 211, the output unit 212, and the signing unit 213. The processor in the non-secure area 22 loads a data delivery program into the memory in the non-secure area 22 and executes the computer program. Thus, the processor in the non-secure area 22 of the data delivery apparatus 2 implements the functions of the publishing unit 221 and the acquiring unit 222, the first transmitting unit 223, the receiving unit 224, the verification unit 225, and the second transmitting unit 226.

The data requesting apparatus 3 is configured to include a processor, a memory, and another storage device in each of the first secure area 21 and the non-secure area 32, which are not illustrated. The other storage device stores a secure program according to the present example embodiment and a computer program in which the data request process is implemented. Then, the processor in the second secure area 31 loads the secure program into the memory in the second secure area 31 and executes the computer program. Thus, the processor in the second secure area 31 of the data requesting apparatus 3 implements the functions of the key generation unit 311, the output unit 312, and the signing unit 313. The processor in the non-secure area 32 loads a data requesting program into the memory in the non-secure area 32 and executes the computer program. Thus, the processor in the non-secure area 32 of the data requesting apparatus 3 implements the functions of the publishing unit 321, the acquiring unit 322, the requesting unit 323, the receiving unit 324, the verification unit 325, and the transmitting unit 326.

Alternatively, the key generation unit 211 and the like described above may be implemented by dedicated hardware. Some or all of the components such as the key generation unit 211 may also be implemented by a general-purpose or dedicated circuitry, a processor, or the like or a combination thereof. Such implementation may be implemented using a single chip or may be implemented using a plurality of chips connected via a bus. Some or all of the components of each apparatus may be implemented by a combination of the circuitry or the like described above and a program. A central processing unit (CPU), a graphics processing unit (GPU), a field-programmable gate array (FPGA), an ARM architecture, Intel software guard extensions (SGX), or the like can also be used as a processor.

Second Example Embodiment

Figure 3:
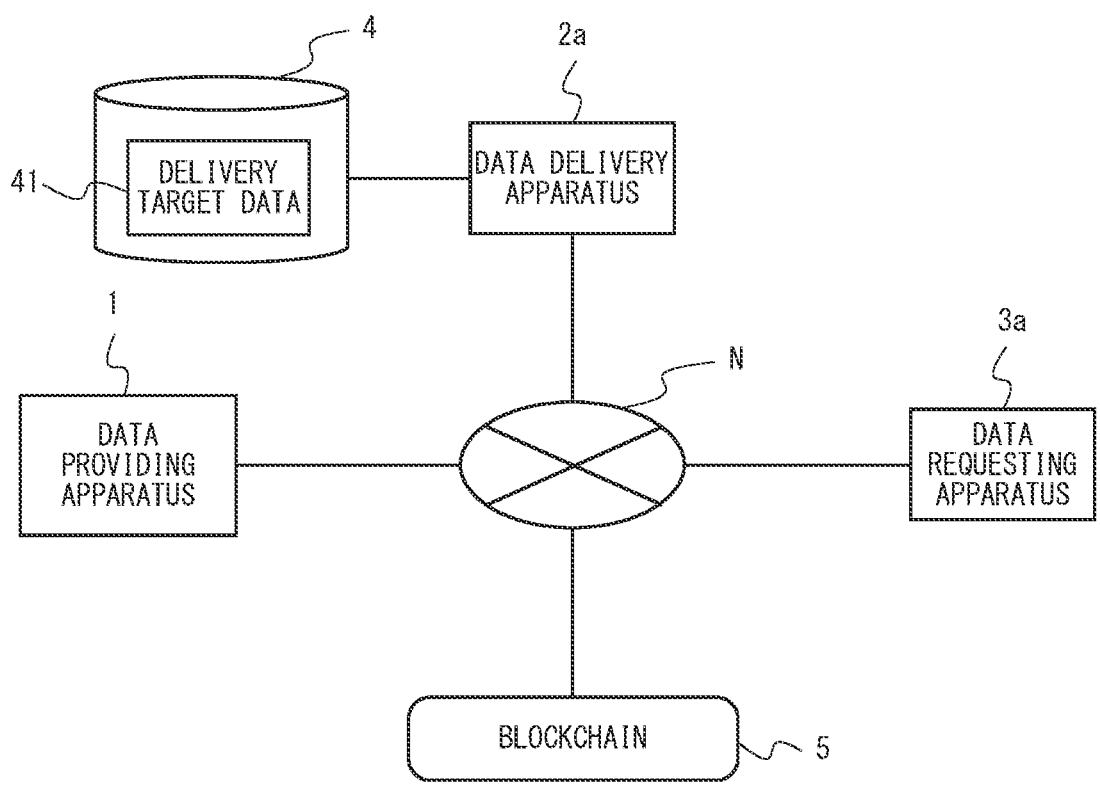
FIG. 3 is a block diagram illustrating an overall configuration of a data delivery system according to a second example embodiment.

FIG. 3 is a block diagram illustrating an overall configuration of a data delivery system 2000 according to a second example embodiment. The data delivery system 2000 includes a data providing apparatus 1, a data delivery apparatus 2a, a data requesting apparatus 3a, a database 4, and a blockchain 5. The data providing apparatus 1, the data delivery apparatus 2a, the data requesting apparatus 3a, and the blockchain 5 are connected at least via a network N. The database 4 may also be connected via the network N. Here, the network N is a communication line such as the Internet.

The database 4 is a file server or the like connected to the data delivery apparatus 2a. The database 4 stores at least delivery target data 41. The delivery target data 41 is, for example, advertisement data. The blockchain 5 is a group of pieces of information that concatenates blocks that are sets of transactions and is ledger information that is distributedly managed on the network N.

Figure 4:
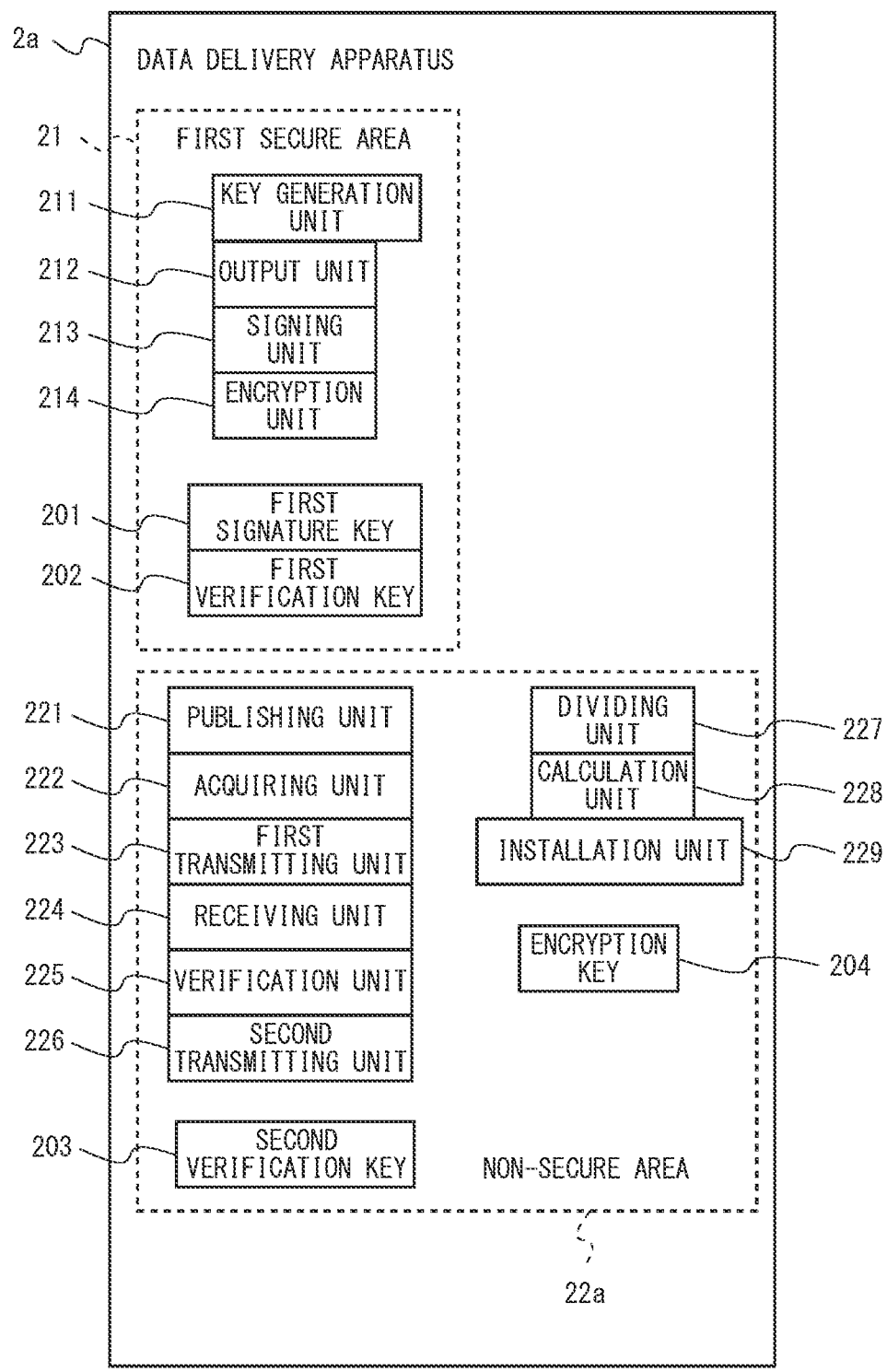
FIG. 4 is a block diagram illustrating a configuration of a data delivery apparatus according to the second example embodiment.

FIG. 4 is a block diagram illustrating a configuration of the data delivery apparatus 2a according to the second example embodiment. The data delivery apparatus 2a is a data delivery apparatus obtained by improving the data delivery apparatus 2 described above. Compared to the data delivery apparatus 2, the data delivery apparatus 2a has an encryption unit 214 added to the first secure area 21 and a dividing unit 227, a calculation unit 228, an installation unit 229, and an encryption key 204 added to a non-secure area 22a corresponding to the non-secure area 22. In the following, description of the same processing as in the first example embodiment will be omitted as appropriate.

The acquiring unit 222 acquires an encryption key 204 for data communication generated in the second secure area 31 in the data requesting apparatus 3a. The encryption key 204 may also be held in the first secure area 21. The encryption unit 214 encrypts processing target data using the encryption key 204 in the first secure area 21 to obtain encrypted data. The signing unit 213 signs the encrypted data using the first signature key 201 in the first secure area 21 to obtain transmission data. This can prevent data alteration.

The calculation unit 228 calculates a hash value (identification information) for the processing target data. The signing unit 213 signs the encrypted data and the hash value in the first secure area 21 using the first signature key 201 to obtain transmission data. Thus, hash value comparison can be used for verification of the transmission data (received data in the data requesting apparatus 3a) and data reliability can be further improved.

The dividing unit 227 divides the delivery target data 41 into a plurality of chunks in response to a data delivery request. In this case, the calculation unit 228 calculates a hash value for each of the plurality of chunks. Then, the encryption unit 214 encrypts each of the plurality of chunks in the first secure area 21 using the encryption key 204. Then, the signing unit 213 signs a pair of each piece of the encrypted data and a hash value corresponding to the piece of the encrypted data in the first secure area 21 using the first signature key 201 to obtain transmission data of each chunk. The first transmitting unit 223 transmits the transmission data of each chunk to the data requesting apparatus 3a. This can limit the amount of data per transmission and guarantee the reliability of each chunk. This further reduces risks when no receipt certification is received from the data requesting apparatus 3a. The following are main reasons for dividing data into chunks. The first reason is a need to deal with the case where data has been transferred, and no receipt certification of the data has been received from the receiver thereafter. Another reason is a need to divide data into divisions of a size for entry into the secure area when the data cannot be stored in the secure area due to memory limitations of the hardware.

Here, the first transmitting unit 223 transmits first transmission data corresponding to the first chunk (obtained by performing the encryption and the signing of data including a hash value) to the data requesting apparatus 3a. Then, the receiving unit 224 receives first certification data, which is a reply to the first transmission data, from the data requesting apparatus 3a. Here, the first certification data is data obtained by signing a first verification result including first identification information for identifying the first chunk in the second secure area 31 in the data requesting apparatus 3a using the second signature key 301. Then, when the verification unit 225 successfully verifies the signature of the first certification data using the second verification key 203, the first transmitting unit 223 transmits second transmission data corresponding to the second chunk to the data requesting apparatus 3a. This can guarantee chunks that have been successfully transmitted, thus improving retransmission efficiency.

When the verification unit 225 cannot verify the signature of the first certification data using the second verification key 203, the second transmitting unit 226 transmits certification data that has been received before the first certification data to the data providing apparatus 1. This makes it possible to accurately provide notification of chunks whose successful transmission can be proven.

The publishing unit 221 publishes information regarding the first secure area 21 and the first verification key 202 by recording the information regarding the first secure area 21 and the first verification key 202 in the blockchain 5. Here, the information regarding the first secure area 21 includes, but is not limited to, identification information of the first secure area 21, trusted hardware specifications, and the like. The acquiring unit 222 acquires the second verification key 302, which the data requesting apparatus 3a has recorded in the blockchain 5, from the blockchain 5. This makes it possible to acquire accurate public information.

The installation unit 229 installs a secure program (which will be described later) including at least the key generation unit 211, the output unit 212, and the signing unit 213 in the first secure area 21. In this case, the publishing unit 221 further publishes interface specifications of the secure program outside. The secure program may also include the encryption unit 214. The interface specifications of the secure program include, for example, specifications of an input value for calling the secure program from the non-secure area and output specifications of an execution result obtained when the secure program is called and executed.

Figure 5:
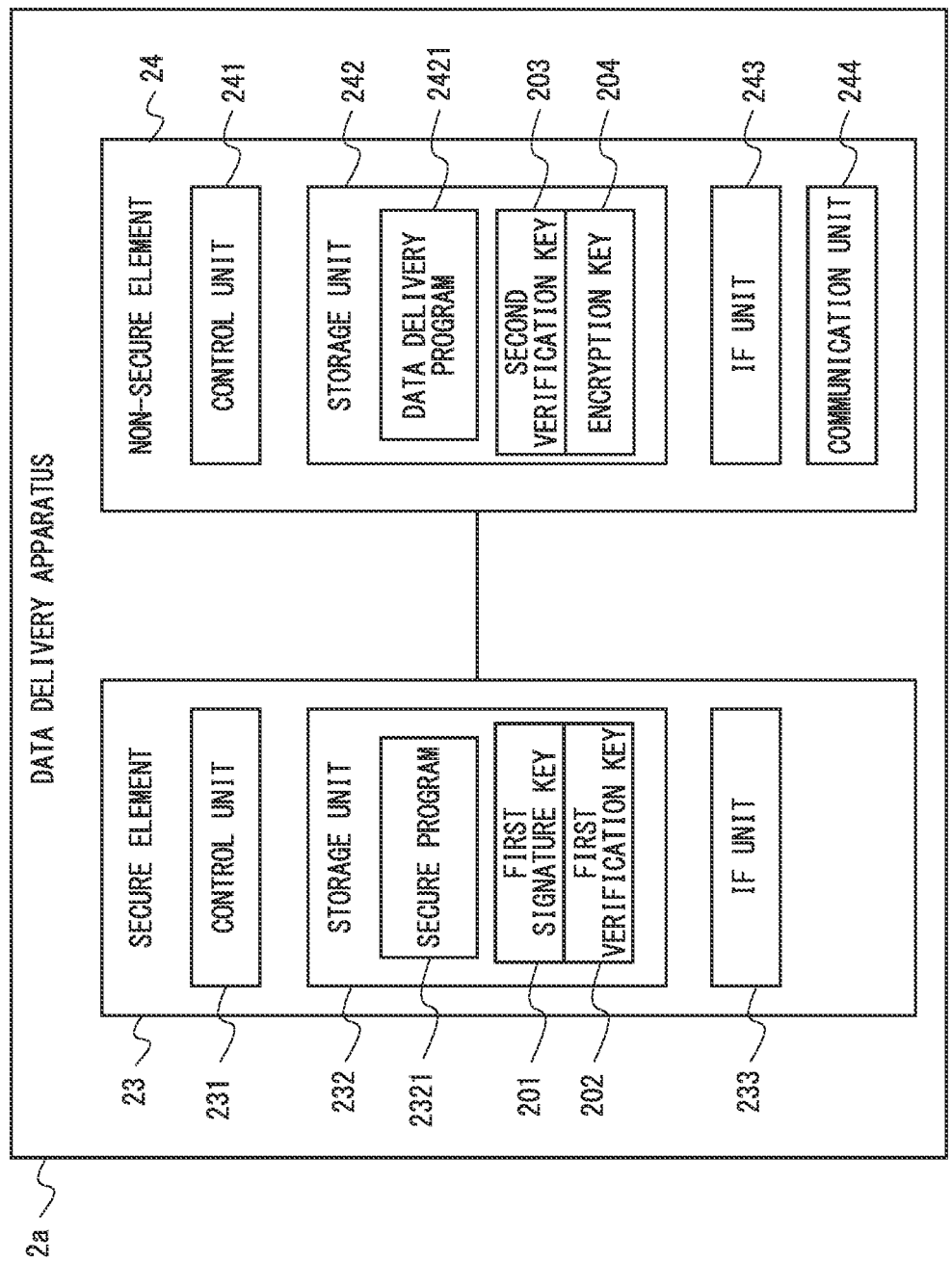
FIG. 5 is a block diagram illustrating a hardware configuration of the data delivery apparatus according to the second example embodiment.

FIG. 5 is a block diagram illustrating a hardware configuration of the data delivery apparatus 2a according to the second example embodiment. The data delivery apparatus 2a includes a secure element 23 and a non-secure element 24. The secure element 23 corresponds to the first secure area 21 described above and the non-secure element 24 corresponds to the non-secure area 22a described above. The non-secure element 24 is a main component of the data delivery apparatus 2a and implements many functions of the data delivery apparatus 2a. The secure element 23 is hardware that is physically or logically separated from the non-secure element 24. The secure element 23 is a more secure execution environment than the non-secure element 24 and is implemented, for example, by the TEE described above.

The secure element 23 includes a control unit 231, a storage unit 232, and an interface (IF) unit 233. The control unit 231 is a processor, that is, a control device that controls each component of the secure element 23. For example, the control unit 231 may be implemented by one or more processor cores. The storage unit 232 is a storage area for temporarily holding information during operation of the control unit 231. The storage unit 232 is, for example, a volatile storage device such as a random access memory (RAM) or a non-volatile storage device such as a flash memory. The storage unit 232 stores the secure program 2321 loaded from (the installation unit 229 of) the non-secure element 24. The secure program 2321 is a computer program in which the processing of the key generation unit 211, the output unit 212, the signing unit 213, and the encryption unit 214 is implemented. The storage unit 232 stores the first signature key 201 and the first verification key 202 generated in the secure element 23. The IF unit 233 is an interface for inputting and outputting information to and from the non-secure element 24. The control unit 231 executes the secure program 2321 loaded in the storage unit 232 to implement the functions of the key generation unit 211, the output unit 212, the signing unit 213, and the encryption unit 214 described above.

The non-secure element 24 includes a control unit 241, a storage unit 242, an IF unit 243, and a communication unit 244. The control unit 241 is a processor, that is, a control device that controls each component of the non-secure element 24. For example, the control unit 241 may be implemented by one or more processor cores. The storage unit 242 is a storage area for temporarily holding information during operation of the control unit 241. The storage unit 232 is, for example, a volatile storage device such as a RAM or a non-volatile storage device such as a flash memory. The storage unit 242 stores a data delivery program 2421 loaded from the control unit 241. The data delivery program 2421 is a computer program in which the processing of the publishing unit 221, the acquiring unit 222, the first transmitting unit 223, the receiving unit 224, the verification unit 225, the second transmitting unit 226, the dividing unit 227, and the calculation unit 228 is implemented. The processing of the installation unit 229 may be further implemented in the data delivery program 2421. The storage unit 242 stores the second verification key 203 and the encryption key 204 acquired from the data requesting apparatus 3a. The encryption key 204 may be stored in the storage unit 232 of the secure element 23. The IF unit 243 is an interface for inputting and outputting information to and from the secure element 23. The communication unit 244 includes a processing circuit, an antenna, and the like for performing processing relating to communication with the outside and transmits and receives information to and from the data providing apparatus 1, the data requesting apparatus 3a, the database 4, the blockchain 5, and the like via the network N. The control unit 241 executes the data delivery program 2421 loaded in the storage unit 242 to implement the functions of the publishing unit 221, the acquiring unit 222, the first transmitting unit 223, the receiving unit 224, the verification unit 225, the second transmitting unit 226, the dividing unit 227, the calculation unit 228, and the installation unit 229 described above.

Figure 6:
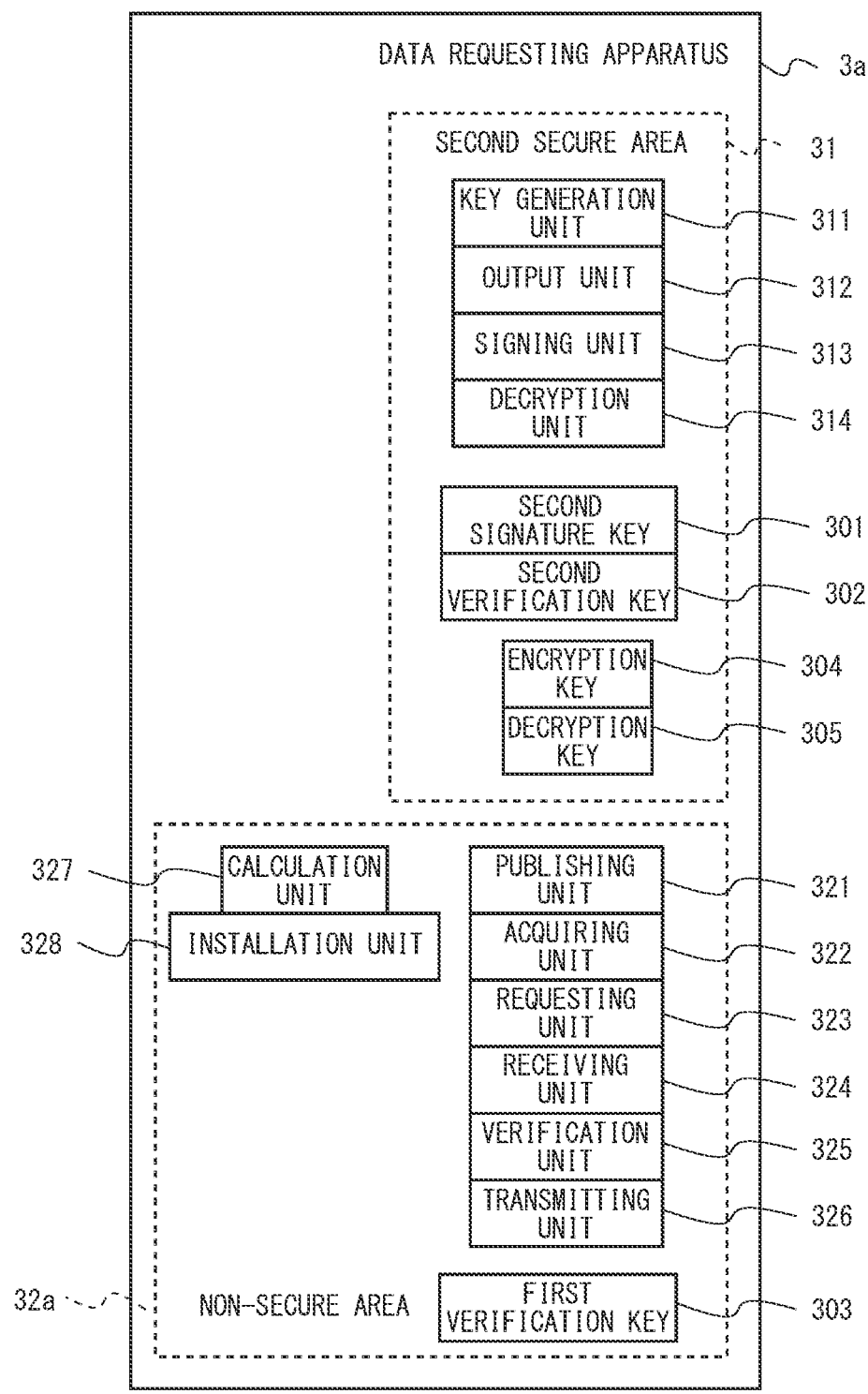
FIG. 6 is a block diagram illustrating a configuration of a data requesting apparatus according to the second example embodiment.

FIG. 6 is a block diagram illustrating a configuration of the data requesting apparatus 3a according to the second example embodiment. The data requesting apparatus 3a is a data requesting apparatus obtained by improving the data requesting apparatus 3 described above. Compared to the data requesting apparatus 3, the data requesting apparatus 3a has a decryption unit 314 added to the second secure area 31 and a calculation unit 327 and an installation unit 328 added to a non-secure area 32a corresponding to the non-secure area 32. In the following, description of the same processing as in the first example embodiment will be omitted as appropriate.

The key generation unit 311 generates a pair of an encryption key 304 and a decryption key 305 for data communication in the second secure area 31. The encryption key 304 is key information for encrypting communication data and is a public key. The decryption key 305 is key information for decrypting the data encrypted by the encryption key 304 and is a private key. The encryption key 304 and the decryption key 305 may be the same, that is, a common key.

The output unit 312 outputs the encryption key 304 to an area (the non-secure area 32) outside the second secure area 31 in the apparatus. The decryption key 305 is not output to the non-secure area 32.

The transmitting unit 326 transmits the output encryption key 304 to the data delivery apparatus 2a. The receiving unit 324 receives the transmission data obtained through the encryption of the encryption unit 214 and the signing of the signing unit 213 described above from the data delivery apparatus 2a. When the signature of the transmission data is successfully verified using the first verification key 303, the decryption unit 314 decrypts encrypted data included in the transmission data using a key (the decryption key 305 here) based on the encryption key 304 in the second secure area 31. This can prevent data alteration. The "key based on the encryption key 304" may also be the encryption key 304.

The receiving unit 324 receives transmission data obtained by signing the hash value calculated for the processing target data and the encrypted data using the first signature key 201 in the first secure area 21. In this case, the calculation unit 327 calculates a verification hash value from decrypted data obtained through the decryption of the decryption unit 314. Then, the verification unit 325 verifies whether the hash value included in the transmission data matches the verification hash value. Then, when the hash value included in the transmission data and the verification hash value match, the signing unit 313 signs a verification result including the hash value as identification information using the second signature key 301 in the second secure area 31 to obtain certification data. Thus, hash value comparison can be used for verification of the received data and data reliability can be further improved.

Further, when the hash value included in the transmission data and the verification hash value match, the calculation unit 327 calculates a verified hash value using the hash value and a hash value included in transmission data prior to the transmission data. Then, the signing unit 313 signs a verification result including the verified hash value as identification information in the second secure area 31 using the second signature key 301 to obtain certification data. Thus, the latest certification data includes verification results based on identification information of all received processing target data and the data delivery apparatus 2a and the data providing apparatus 1 can verify the amount of properly received data based on the latest certification data.

The publishing unit 321 publishes information regarding the second secure area 31 and the second verification key 302 by recording the information regarding the second secure area 31 and the second verification key 302 in the blockchain 5. Here, the information regarding the second secure area 31 includes, but is not limited to, identification information of the second secure area 31, trusted hardware specifications, and the like. The acquiring unit 322 acquires the first verification key 202, which the data delivery apparatus 2a has recorded in the blockchain 5, from the blockchain 5. This makes it possible to acquire accurate public information.

The installation unit 328 installs a secure program (which will be described later) including at least the key generation unit 311, the output unit 312, and the signing unit 313 in the second secure area 31. In this case, the publishing unit 321 further publishes interface specifications of the secure program outside. The secure program may also include the decryption unit 314.

Figure 7:
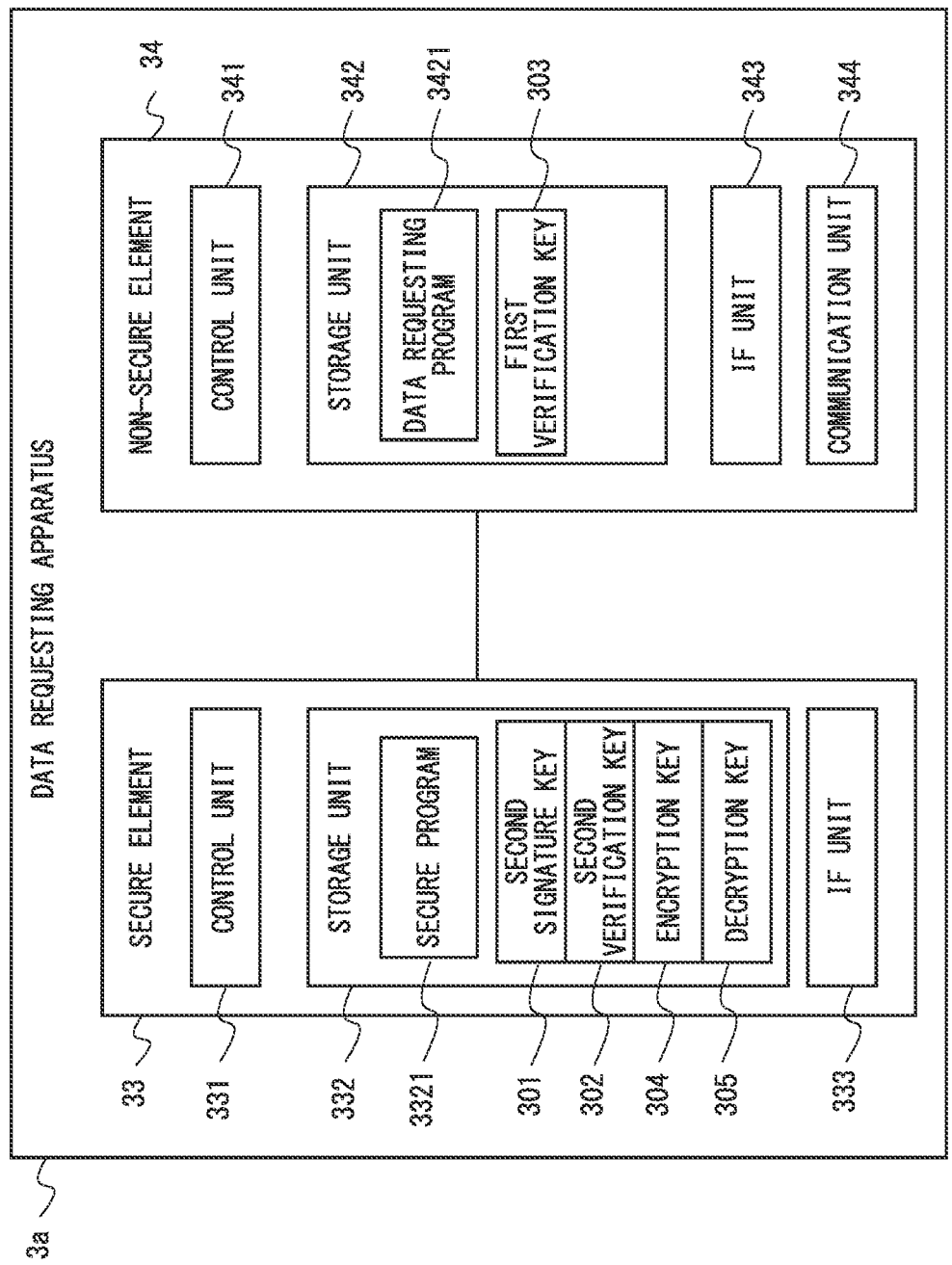
FIG. 7 is a block diagram illustrating a hardware configuration of the data requesting apparatus according to the second example embodiment.

FIG. 7 is a block diagram illustrating a hardware configuration of the data requesting apparatus 3a according to the second example embodiment. The data requesting apparatus 3a includes a secure element 33 and a non-secure element 34. The secure element 33 corresponds to the second secure area 31 described above and the non-secure element 34 corresponds to the non-secure area 32a described above. The non-secure element 34 is a main component of the data requesting apparatus 3a and implements many functions of the data requesting apparatus 3a. The secure element 33 is hardware that is physically or logically separated from the non-secure element 34. The secure element 33 is a more secure execution environment than the non-secure element 34 and is implemented, for example, by the TEE described above.

The secure element 33 includes a control unit 331, a storage unit 332, and an IF unit 333. The control unit 331 is a processor, that is, a control device that controls each component of the secure element 33. For example, the control unit 331 may be implemented by one or more processor cores. The storage unit 332 is a storage area for temporarily holding information during operation of the control unit 331. The storage unit 332 is, for example, a volatile storage device such as a RAM or a non-volatile storage device such as a flash memory. The storage unit 332 stores the secure program 3321 loaded from (the installation unit 328 of) the non-secure element 34. The secure program 3321 is a computer program in which the processing of the key generation unit 311, the output unit 312, the signing unit 313, and the decryption unit 314 is implemented. The storage unit 332 stores the second signature key 301, the second verification key 302, the encryption key 304, and the decryption key 305 generated in the secure element 33. The IF unit 333 is an interface for inputting and outputting information to and from the non-secure element 34. The control unit 331 executes the secure program 3321 loaded in the storage unit 332 to implement the functions of the key generation unit 311, the output unit 312, the signing unit 313, and the decryption unit 314 described above.

The non-secure element 34 includes a control unit 341, a storage unit 342, an IF unit 343, and a communication unit 344. The control unit 341 is a processor, that is, a control device that controls each component of the non-secure element 34. For example, the control unit 341 may be implemented by one or more processor cores. The storage unit 342 is a storage area for temporarily holding information during operation of the control unit 341. The storage unit 332 is, for example, a volatile storage device such as a RAM or a non-volatile storage device such as a flash memory. The storage unit 342 stores a data requesting program 3421 loaded from the control unit 341. The data requesting program 3421 is a computer program in which the processing of the publishing unit 321, the acquiring unit 322, the requesting unit 323, the receiving unit 324, the verification unit 325, the transmitting unit 326, and the calculation unit 327 is implemented. The processing of the installation unit 328 may be further implemented in the data requesting program 3421. The storage unit 342 stores the first verification key 303 acquired from the data delivery apparatus 2a. The IF unit 343 is an interface for inputting and outputting information to and from the secure element 33. The communication unit 344 includes a processing circuit, an antenna, and the like for performing processing relating to communication with the outside and transmits and receives information to and from the data providing apparatus 1, data delivery apparatus 2a, the database 4, the blockchain 5, and the like via the network N. The control unit 341 executes the data requesting program 3421 loaded in the storage unit 342 to implement the functions of the publishing unit 321, the acquiring unit 322, the requesting unit 323, the receiving unit 324, the verification unit 325, the transmitting unit 326, the calculation unit 327, and the installation unit 328 described above.

The secure elements 23 and 33 described above may be isolated from other processing areas in hardware or may be isolated from other processing areas in software.

Figure 8:
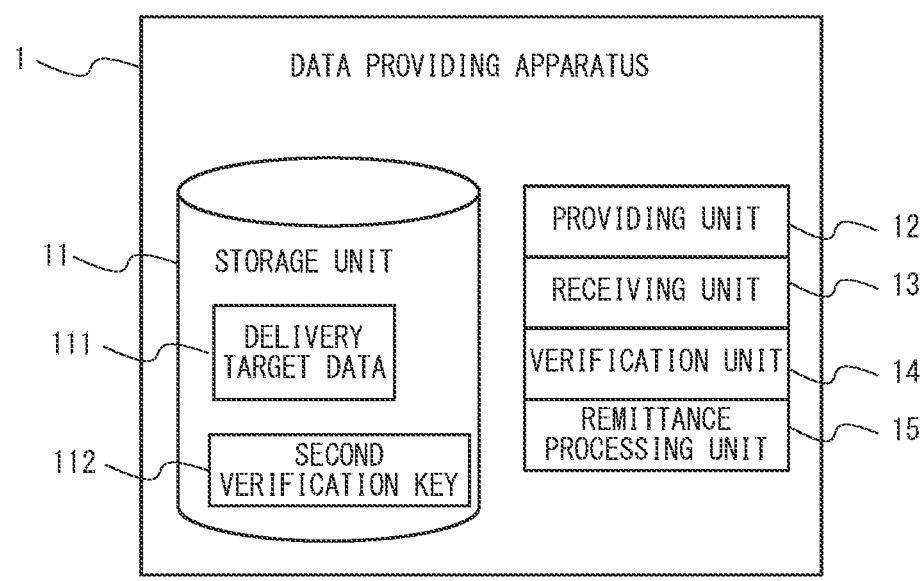
FIG. 8 is a block diagram illustrating a configuration of a data providing apparatus according to the second example embodiment.

FIG. 8 is a block diagram illustrating a configuration of the data providing apparatus 1 according to the second example embodiment. The data providing apparatus 1 includes a storage unit 11, a providing unit 12, a receiving unit 13, a verification unit 14, and a remittance processing unit 15. The storage unit 11 is a non-volatile storage device and stores delivery target data 111 and a second verification key 112. The delivery target data 111 is data equivalent to the delivery target data 41. The second verification key 112 is key information equivalent to the second verification key 302 generated by the data requesting apparatus 3a.

The providing unit 12 transmits the delivery target data 111 to the data delivery apparatus 2a via the network N and stores the delivery target data 111 in the database 4 as delivery target data 41. The receiving unit 13 receives certification data from the data delivery apparatus 2a. The verification unit 14 verifies the signature of the received certification data using the second verification key 112. When the signature is successfully verified, the remittance processing unit 15 remits an amount of money corresponding to the certification data to the data delivery apparatus 2a. Here, it is assumed that the remittance process uses a known technique. For example, an instruction to remit money from an account of the data providing apparatus 1 to an account of the data delivery apparatus 2a may be performed in a financial system. Here, the financial system may be not only a bank or the like but also a cryptocurrency (virtual currency) or a crypto asset managed by a blockchain. Further, when the signature of the certification data is successfully verified using the second verification key 112, the remittance processing unit 15 remits an amount of money corresponding to the number of verified chunks to the data delivery apparatus 2a. Thus, when the transmission of some chunks cannot be confirmed, extra expenditure corresponding to the chunks can be prevented.

The data providing apparatus 1 is configured to include a processor, a memory, and a storage device, which are not illustrated. The storage device stores a computer program in which the processing of the data providing apparatus 1 according to the present example embodiment is implemented. Then, the processor loads the computer program from the storage device into the memory and executes the computer program. Thus, the processor implements the functions of the providing unit 12, the receiving unit 13, the verification unit 14, and the remittance processing unit 15.

Alternatively, the providing unit 12, the receiving unit 13, the verification unit 14, and the remittance processing unit 15 may each be implemented by dedicated hardware. Some or all of the components of each apparatus may also be implemented by a general-purpose or dedicated circuitry, a processor, or the like or a combination thereof. Such implementation may be implemented using a single chip or may be implemented using a plurality of chips connected via a bus. Some or all of the components of each apparatus may be implemented by a combination of the circuitry or the like described above and a program. A CPU, a GPU, an FPGA, or the like can also be used as a processor.

Figure 9:
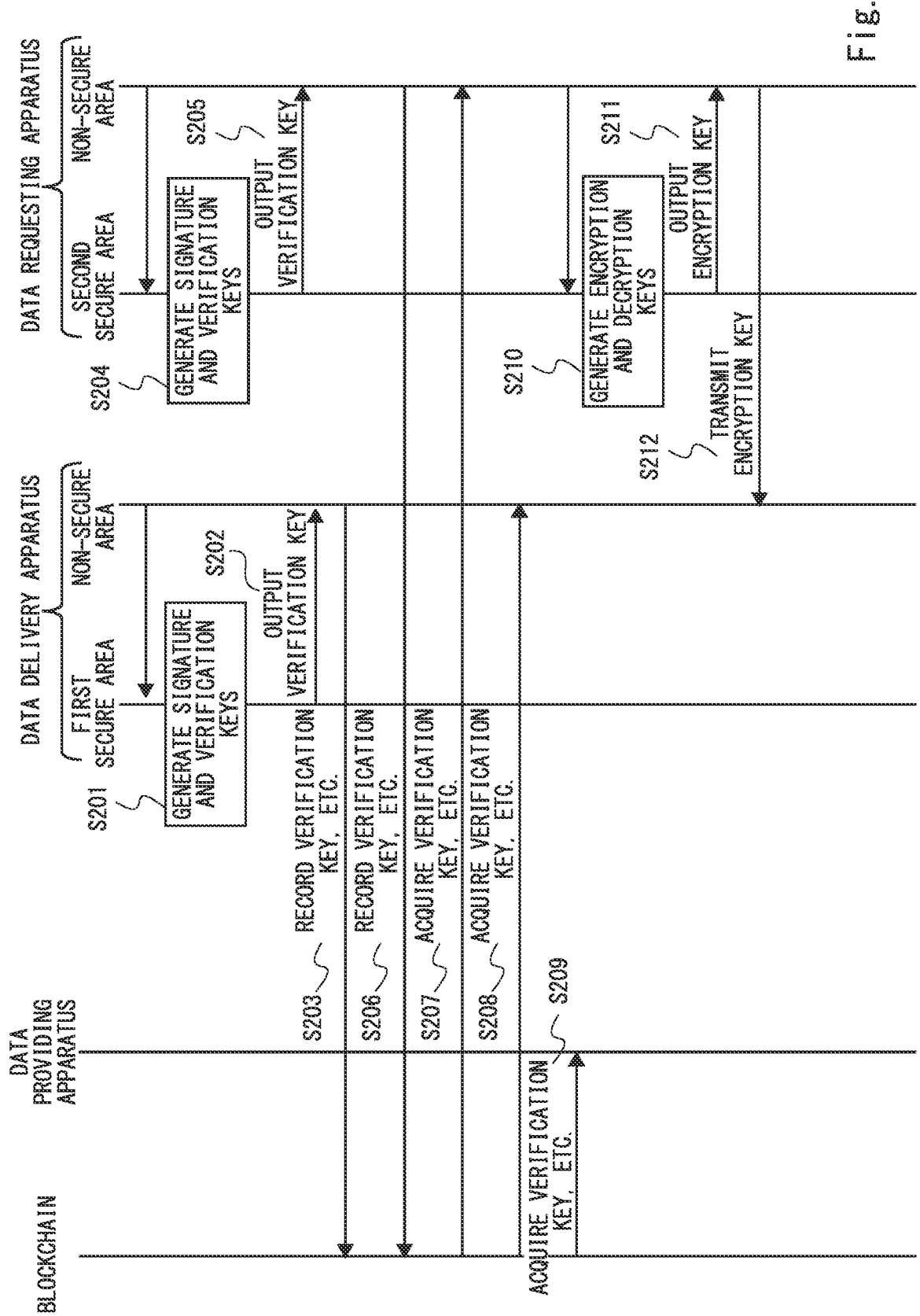
FIG. 9 is a sequence diagram illustrating a series of steps of key generation and publishing according to the second example embodiment.

FIG. 9 is a sequence diagram illustrating steps of key generation and publishing according to the second example embodiment. Here, it is assumed that enclaves corresponding to the first secure area 21 and the second secure area 31 are created in each apparatus in advance when the data delivery apparatus 2a and the data requesting apparatus 3a are implemented using Intel SGX.

First, in the data delivery apparatus 2a, the non-secure area 22a instructs the key generation unit 211 to generate a signature key and a verification key. Then, the key generation unit 211 generates a pair of a first signature key 201 and a first verification key 202 in the first secure area 21 (S201). Next, the output unit 212 outputs the first verification key 202 to the non-secure area 22a (S202). Then, the publishing unit 221 records the output first verification key 202 in the blockchain 5 (S203). At the same time, the publishing unit 221 may also record information or the like regarding the first secure area 21. Examples of the information regarding the first secure area 21 include, but are not limited to, information indicating that the secure program 2321 has been installed in the first secure area 21, interface specifications of the secure program 2321, and identification information of the first secure area 21.

Further, in the data requesting apparatus 3*a*, the non-secure area 32*a* instructs the key generation unit 311 to generate a signature key and a verification key. Then, the key generation unit 311 generates a pair of a second signature key 301 and a second verification key 302 in the second secure area 31 (S204). Next, the output unit 312 outputs the second verification key 302 to the non-secure area 32*a* (S205). Then, the publishing unit 321 records the output second verification key 302 in the blockchain 5 (S206). At the same time, the publishing unit 321 may also record information or the like regarding the second secure area 31. Examples of the information regarding the second secure area 31 include, but are not limited to, information indicating that the secure program 3321 has been installed in the second secure area 31, interface specifications of the secure program 3321, and identification information of the second secure area 31.

After that, the acquiring unit 322 of the data requesting apparatus 3*a* acquires the first verification key 202 from the blockchain 5 (S207) and holds it internally as a first verification key 303. The acquiring unit 222 of the data delivery apparatus 2*a* also acquires the second verification key 302 from the blockchain 5 (S208) and holds it internally as a second verification key 203. Further, the data providing apparatus 1 acquires the second verification key 302 from the blockchain 5 (S209) and holds it in the storage unit 11 as a second verification key 112.

After that, in the data requesting apparatus 3*a*, the non-secure area 32*a* specifies a key length (for example, 128 bits), an encryption type (such as, for example, RSA or elliptic curve), and the like for the key generation unit 311 and instructs the key generation unit 311 to generate an encryption key and a decryption key. Here, not only a public key encryption scheme such as RSA encryption and elliptic curve encryption, but also a common key encryption scheme such as advanced encryption standard-Galois/counter mode (AES-GCM) can be specified as an encryption type. In this case, the encryption key is identical to the decryption key. Then, the key generation unit 311 generates a pair of an encryption key 304 and a decryption key 305 in the second secure area 31 (S210). Then, the output unit 312 outputs the encryption key 304 to the non-secure area 32*a* (S211). After that, the transmitting unit 326 transmits the encryption key 304 to the data delivery apparatus 2*a* via the network N (S212). Here, it is assumed that the transmitting unit 326 transmits the encryption key 304 using a secure channel. In response to this, the acquiring unit 222 of the data delivery apparatus 2*a* acquires the encryption key 304 via the network N and stores it in the non-secure area 22*a* or the first secure area 21 as an encryption key 204.

Figure 10:
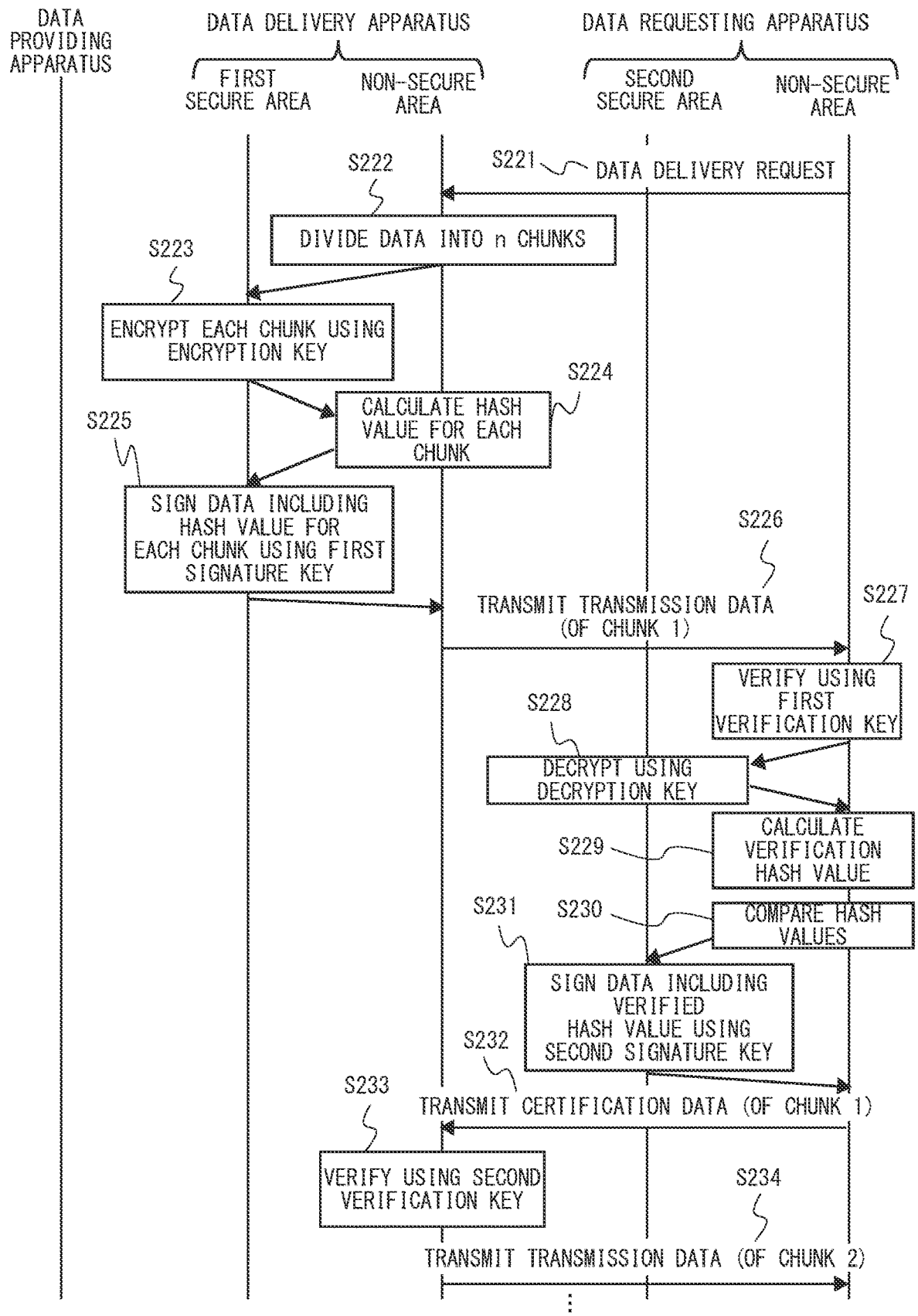
FIG. 10 is a sequence diagram illustrating a series of steps of a data delivery method according to the second example embodiment.
Figure 11:
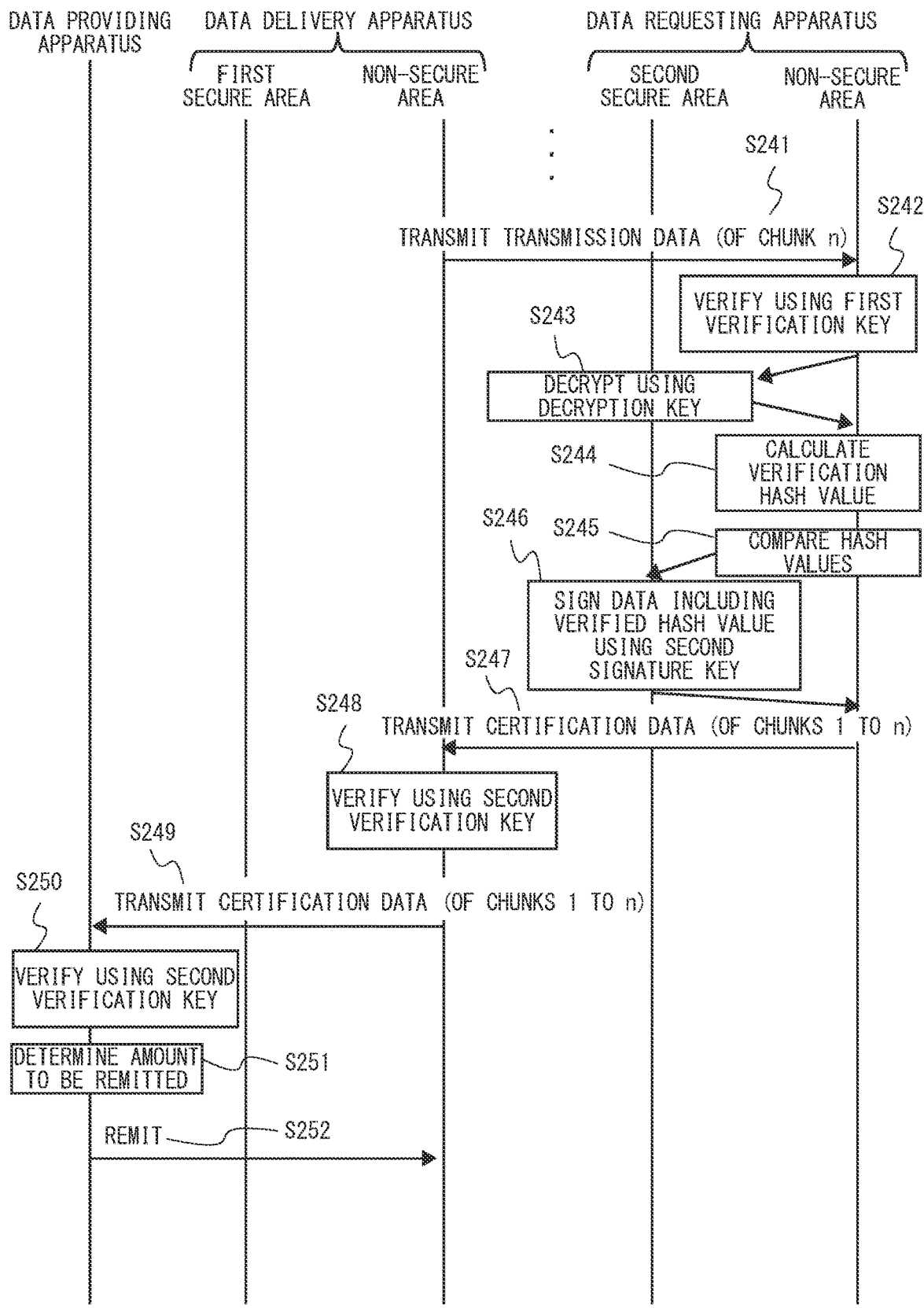
FIG. 11 is a sequence diagram illustrating the series of steps of the data delivery method according to the second example embodiment.

Next, FIGS. 10 and 11 are sequence diagrams illustrating a series of steps of a data delivery method according to the second example embodiment. First, the requesting unit 323 of the data requesting apparatus 3*a* transmits a data delivery request to the data delivery apparatus 2*a* via the network N (S221). Here, it is assumed that identification information (dataID) of delivery target data 41 has been specified in the data delivery request. In response to this, the dividing unit 227 of the data delivery apparatus 2*a* divides the delivery target data 41 into n chunks (where n is a natural number of 2 or more) (S222). Specifically, the dividing unit 227 reads delivery target data 41 corresponding to a dataID specified in the data delivery request from the database 4 and divides the delivery target data 41 into n chunks according to a predetermined number of divisions n.

Then, the dividing unit 227 specifies the encryption key 204 for the encryption unit 214 and instructs the encryption unit 214 to encrypt each chunk. The encryption unit 214 reads the encryption key 204 and each chunk from the non-secure area 22*a* into the first secure area 21 and encrypts each chunk in the first secure area 21 using the encryption key 204. It is assumed that each encrypted chunk (encrypted data) is expressed as "enc (pk_enc, dataChunk_i)". Here, pk_enc corresponds to the encryption key 204 and dataChunk_i corresponds to an i-th chunk (where i is a natural number from 1 to n).

Next, the calculation unit 228 calculates a hash value (hash_i) for each chunk (S224). Although FIG. 10 indicates that the calculation unit 228 calculates hash values in the non-secure area 22*a*, it may also calculate hash values in the first secure area 21. The calculation unit 228 instructs the signing unit 213 to sign. Then, the signing unit 213 signs data including the hash value for each chunk in the first secure area 21 using the first signature key 201 (S225). Specifically, the signing unit 213 collectively signs the i-th encrypted data, the dataID, the chunk number i, the total number of chunks n, and the i-th hash value. It is assumed that the signed data is expressed as "<enc (pk_enc, dataChunk_i), dataID, i, n, hash_i>σ1". Here, σ1 corresponds to the first signature key 201. Then, the output unit 212 outputs the signed data (transmission data) to the non-secure area 22*a*. Here, steps S223 to S225 may be collectively performed for each of i=1 to n. Alternatively, steps S223 to S233 for the i+1-th chunk may be performed after steps S223 to S233 for the i-th chunk are completed.

Subsequently, the first transmitting unit 223 transmits the signed transmission data of the chunk 1 to the data requesting apparatus 3*a* via the network N (S226). In response to this, the receiving unit 324 of the data requesting apparatus 3*a* receives the transmission data (of chunk 1). Then, the verification unit 325 verifies the signature of the received transmission data (of chunk 1) using the first verification key 303 (S227). When the signature is successfully verified, the verification unit 325 extracts the first encrypted data, the dataID, the chunk number 1, the total number of chunks n, and the first hash value from the transmission data. Then, the verification unit 325 instructs the decryption unit 314 to decrypt the first encrypted data. When the signature cannot be verified, the data requesting apparatus 3*a* may reply to the data delivery apparatus 2*a* that the signature cannot be verified and request the data delivery apparatus 2*a* to perform retransmission.

The decryption unit 314 decrypts the first encrypted data using the decryption key 305 in the second secure area 31 (S228). Then, the output unit 312 outputs the decrypted data from the second secure area 31 to the non-secure area 32*a*. The calculation unit 327 calculates a verification hash value for the decrypted data (S229). Although FIG. 10 indicates that the calculation unit 327 calculates the verification hash value in the non-secure area 32*a*, it may also calculate the verification hash value in the second secure area 31. In that case, the output unit 312 outputs the calculated verification hash value from the second secure area 31 to the non-secure area 32*a*.

Then, the verification unit 325 compares the first hash value extracted from the transmission data with the verification hash value calculated by the calculation unit 327

(S230) and determines whether the hash values match. When it is determined that the hash values do not match, the data requesting apparatus 3a may reply to the data delivery apparatus 2a that the hash values do not match and request the data delivery apparatus 2a to perform retransmission.

Upon determining that the hash values match, the verification unit 325 instructs the signing unit 313 to sign. The signing unit 313 signs data including the verified hash value in the non-secure area 32 using the second signature key 301 (S231). Specifically, the signing unit 313 collectively signs the m-th hash value, the chunk number m, and the dataID. It is assumed that the signed data is expressed as "<hash_m, m, dataID>σ2". Here, σ2 corresponds to the second signature key 301. The verified hash value may be a hash value for a character string that concatenates the verified hash values, including up to the most immediately preceding verified hash value, and the hash value included in the transmission data received this time. Specifically, it is assumed that the verified hash value is expressed as "hash (hash_1∥hash_2∥ . . . ∥hash_m)." In this case, the signed data can be expressed as "<hash(hash_1∥hash_2∥ . . . ∥hash_m), m, dataID>σ2." Further, the calculation unit 327 may perform calculation such that "hash(hash_1∥hash_2∥ . . . ∥hash_m)=hash_[1 . . . m]," whereby signed data for the data of the next chunk number m+1 can be expressed as "<hash (hash_[1 . . . m]∥hash_m+1), m, dataID>σ2." The calculation unit 327 may also calculate the verified hash value such that "hash(hash_[1 . . . m]∥hash_m+1)=hash_[1 . . . m+1]," whereby the signed data can be expressed as "<hash_[1 . . . m+1], m, dataID>σ2."

After that, the transmitting unit 326 transmits signed certification data (of chunk 1) to the data delivery apparatus 2a via the network N (S232). In response to this, the receiving unit 224 of the data delivery apparatus 2a receives the certification data (of chunk 1) via the network N. Then, the verification unit 225 verifies the signature of the received certification data (of chunk 1) using the second verification key 203 (S233). If the signature cannot be verified, the first transmitting unit 223 does not transmit transmission data of the next chunk and the second transmitting unit 226 transmits that fact to the data providing apparatus 1. On the other hand, if the signature is successfully verified in step S233, the second transmitting unit 226 transmits the signed transmission data of the next chunk, chunk 2, to the data requesting apparatus 3a via the network N (S234). After that, steps S227 to S233 are performed with m being equal to 2.

Steps S241 to S247 are also performed with m being equal to n, that is, for chunk n. In this case, the signed data in step S246 can be expressed as "<hash(hash_1∥hash_2∥ . . . ∥hash_n), n, dataID>σ2."

Then, the transmitting unit 326 transmits the signed certification data (of chunks 1 to n) to the data delivery apparatus 2a via the network N (S247). In response to this, the receiving unit 224 of the data delivery apparatus 2a receives the certification data (of chunks 1 to n) via the network N. Then, the verification unit 225 verifies the signature of the received certification data (of chunks 1 to n) using the second verification key 203 (S248). When the signature is successfully verified, the second transmitting unit 226 transmits the certification data (of chunks 1 to n) to the data providing apparatus 1 via the network N (S249).

If the verification unit 225 fails to verify the signature of the certification data (of chunks 1 to m) with m being equal to 2 to n−1, the first transmitting unit 223 does not transmit the transmission data of the next chunk. Further, if the verification unit 225 fails to verify the signature of the certification data (of chunks 1 to m) with m being equal to 2 to n, the second transmitting unit 226 transmits the certification data (of chunks 1 to m−1) for m−1 to the data providing apparatus 1 via the network N. That is, the second transmitting unit 226 transmits the latest (last) certification data whose signature is successfully verified.

After step S249, the receiving unit 13 of the data providing apparatus 1 receives the certification data (of chunks 1 to n) via the network N. Then, the verification unit 14 verifies the signature of the received certification data (of chunks 1 to n) using the second verification key 112 (S250). Subsequently, the remittance processing unit 15 determines an amount to be remitted based on the verified certification data (S251). Specifically, the remittance processing unit 15 extracts a Data ID and a chunk number from the certification data. Then, the remittance processing unit 15 calculates an amount to be remitted by multiplying a predetermined payment amount for the delivery of DataID by the ratio of the chunk number (that has been successfully transmitted) to the total number of chunks. Then, the remittance processing unit 15 remits the calculated amount to be remitted to the data delivery apparatus 2a via the network N (S252).

The second transmitting unit 226 may record the certification data whose signature is successfully verified in the blockchain 5 via the network N. This also results in allowing the data providing apparatus 1 to acquire the certification data from the blockchain 5 via the network N.

<Other Example Embodiments>

In the second example embodiment, the data requesting apparatus 3a generates an encryption key and transmits the encryption key to the data delivery apparatus 2a through a secure channel, but the second example embodiment is not limited to this. For example, the data delivery apparatus 2a may generate an encryption key (a symmetric key or a common key) and transmit the encryption key to the data requesting apparatus 3a through a secure channel. In this case, the decryption unit 314 of the data requesting apparatus 3a uses the received encryption key as a decryption key. Alternatively, the data requesting apparatus 3a may generate a pair of an encryption key and a decryption key and transmit the decryption key to the data requesting apparatus 3a through a secure channel. In this case, the decryption unit 314 of the data requesting apparatus 3a uses the received decryption key.

In the above example embodiment, the elements described in the drawings as functional blocks that perform various processing can each be implemented by hardware using a central processing unit (CPU), a memory, and other circuits and can be implemented by software using a program or the like that a CPU loads and executes in a memory. Thus, it will be understood by those skilled in the art that such functional blocks can be implemented in various forms, using but not limited to hardware only, software only, or a combination thereof.

The program described above can be stored and provided to a computer using various types of non-transitory computer readable media. Non-transitory computer readable media include various types of tangible storage media. Examples of non-transitory computer readable media include magnetic storage media (for example, a flexible disk, a magnetic tape, and a hard disk drive), magneto-optical storage media (for example, a magneto-optical disc), a compact disc read-only memory (CD-ROM), a CD-recordable (CD-R), a CD-rewritable (CD-R/W), and semiconductor memories (for example, a mask ROM, a programmable ROM (PROM), an erasable PROM (EPROM), a flash ROM, and a random access memory (RAM)). The program may be provided to a computer using various types of transitory computer readable media. Examples of transitory computer readable media include electric signals, optical signals, and electromagnetic waves. Transitory computer readable media can provide the program to a computer via a wired communication line such as an electric wire or an optical fiber or a wireless communication line.

The present disclosure is not limited to the above example embodiments and can be modified as appropriate without departing from the gist. The present disclosure may also be carried out by appropriately combining the example embodiments.

Some or all of the above example embodiments may be described as in but not limited to the following supplements.

(Supplement A1)

A data delivery apparatus including:
a key generation means for generating a pair of a first signature key and a first verification key in a first secure area of the data delivery apparatus;
an output means for outputting the first verification key to an area outside the first secure area in the data delivery apparatus;
a publishing means for publishing the output first verification key outside the data delivery apparatus;
an acquiring means for acquiring a second verification key that is published out of a pair of a second signature key and the second verification key generated in a second secure area of a data requesting apparatus;
a signing means for signing, in the first secure area, in response to a data delivery request from the data requesting apparatus, processing target data using the first signature key, the processing target data including at least part of delivery target data provided by a data providing apparatus;
a first transmitting means for transmitting transmission data obtained through the signing to the data requesting apparatus;
a receiving means for receiving, when the signature of the transmission data is successfully verified using the first verification key in the data requesting apparatus, certification data from the data requesting apparatus, the certification data being obtained by signing, in the second secure area, a verification result by using the second signature key, the verification result including identification information for identifying the processing target data;
a verification means for verifying a signature of the certification data using the second verification key; and
a second transmitting means for transmitting, when the signature of the certification data is successfully verified using the second verification key, the certification data to the data providing apparatus.

(Supplement A2)

The data delivery apparatus according to supplement A1, wherein the acquiring means acquires an encryption key for data communication generated in the second secure area in the data requesting apparatus,
the data delivery apparatus further includes an encryption means for encrypting the processing target data using the encryption key in the first secure area to obtain encrypted data, and
the signing means signs, in the first secure area, the encrypted data using the first signature key to obtain the transmission data.

(Supplement A3)

The data delivery apparatus according to supplement A2, further including a calculation means for calculating a hash value for the processing target data, wherein the signing means signs, in the first secure area, the encrypted data and the hash value using the first signature key to obtain the transmission data.

(Supplement A4)

The data delivery apparatus according to supplement A3, further including a dividing means for dividing, in response to the data delivery request, the delivery target data into a plurality of chunks,
wherein the calculation means calculates a hash value for each of the plurality of chunks,
the encryption means encrypts each of the plurality of chunks in the first secure area using the encryption key,
the signing means signs, in the first secure area, a pair of each piece of the encrypted data and a hash value corresponding to the piece of the encrypted data using the first signature key to obtain the transmission data for each of the plurality of chunks, and
the transmitting means transmits to the data requesting apparatus the transmission data for each of the plurality of chunks.

(Supplement A5)

The data delivery apparatus according to supplement A4, wherein
the receiving means receives, when the signature of first transmission data corresponding to a first chunk is successfully verified using the first verification key in the data requesting apparatus, first certification data from the data requesting apparatus, the first certification data being obtained by signing, in the second secure area, a first verification result by using the second signature key, the first verification result including first identification information for identifying the first chunk, and
the first transmitting means transmits, when the verification means successfully verifies a signature of the first certification data using the second verification key, second transmission data corresponding to a second chunk to the data requesting apparatus.

(Supplement A6)

The data delivery apparatus according to any one of supplements A1 to A5, wherein
the publishing means publishes information of the first secure area and the first verification key by recording the information of the first secure area and the first verification key in a blockchain, and
the acquiring means acquires from the blockchain the second verification key that the data requesting apparatus has recorded in the blockchain.

(Supplement A7)

The data delivery apparatus according to any one of supplements A1 to A6, further including an installation means for installing a secure program including at least the key generation means, the output means, and the signing means in the first secure area,
wherein the publishing means further publishes an interface specification of the secure program outside the data delivery apparatus.

(Supplement A8)

The data delivery apparatus according to any one of supplements A1 to A7, wherein
the first secure area is a trusted execution environment (TEE) that is a more secure execution environment than an area outside the first secure area in the data delivery apparatus, and the second secure area is a TEE that is a more secure execution environment than an area outside the second secure area in the data requesting apparatus.

(Supplement B1)

A data requesting apparatus including:
an acquiring means for acquiring a first verification key that is published out of a pair of a first signature key and the first verification key generated in a first secure area of a data delivery apparatus;
a key generation means for generating a pair of a second signature key and a second verification key in a second secure area of the data requesting apparatus;
an output means for outputting the second verification key to an area outside the second secure area in the data requesting apparatus;
a publishing means for publishing the output second verification key outside;
a requesting means for requesting the data delivery apparatus to deliver delivery target data provided by a data providing apparatus;
a receiving means for receiving, from the data delivery apparatus, transmission data obtained by signing, in the first secure area in the data delivery apparatus, processing target data using the first signature key, the processing target data including at least part of the delivery target data;
a verification means for verifying a signature of the transmission data using the first verification key;
a signing means for signing, in the second secure area, when the signature of the transmission data is successfully verified using the first verification key, a verification result using the second signature key, the verification result including identification information for identifying the processing target data; and
a transmitting means for transmitting certification data obtained through the signing to the data delivery apparatus.

(Supplement B2)

The data requesting apparatus according to supplement B1, wherein
the key generation means generates an encryption key for data communication in the second secure area,
the output means outputs the encryption key to an area outside the second secure area in the data requesting apparatus,
the transmitting means transmits the output encryption key to the data delivery apparatus,
the receiving means receives, from the data delivery apparatus, the transmission data obtained by signing, in the first secure area, encrypted data using the first signature key, the encrypted data being obtained by encrypting the processing target data using the encryption key in the first secure area, and
the data requesting apparatus further includes a decryption means for decrypting, when the signature of the transmission data is successfully verified using the first verification key, the encrypted data included in the transmission data using a key based on the encryption key in the second secure area.

(Supplement B3)

The data requesting apparatus according to supplement B2, wherein
the receiving means receives the transmission data obtained by signing, in the first secure area, a hash value calculated for the processing target data and the encrypted data by using the first signature key,
the data requesting apparatus further includes a calculation means for calculating a verification hash value from decrypted data obtained through the decryption of the decryption means,
the verification means verifies whether the hash value included in the transmission data and the verification hash value match, and
the signing means signs, in the second secure area, when the hash value included in the transmission data and the verification hash value match, the verification result including the hash value as the identification information using the second signature key to obtain the certification data.

(Supplement B4)

The data requesting apparatus according to supplement B3, wherein
the calculation means calculates, when the hash value included in the transmission data and the verification hash value match, a verified hash value using the hash value and a hash value included in transmission data prior to the transmission data, and
the signing means signs, in the second secure area, the verification result including the verified hash value as the identification information using the second signature key to obtain the certification data.

(Supplement B5)

The data requesting apparatus according to any one of supplements B1 to B4, wherein
the publishing means publishes information of the second secure area and the second verification key by recording the information of the second secure area and the second verification key in a blockchain, and
the acquiring means acquires, from the blockchain, the first verification key that the data delivery apparatus has recorded in the blockchain.

(Supplement B6)

The data requesting apparatus according to any one of supplements B1 to B5, further including an installation means for installing a secure program including at least the key generation means, the output means, and the signing means in the second secure area,
wherein the publishing means further publishes an interface specification of the secure program outside the data requesting apparatus.

(Supplement B7)

The data requesting apparatus according to any one of supplements B1 to B6, wherein
the first secure area is a trusted execution environment (TEE) that is a more secure execution environment than an area outside the first secure area in the data delivery apparatus, and
the second secure area is a TEE that is a more secure execution environment than an area outside the second secure area in the data requesting apparatus.

(Supplement C1)

A data delivery system including:
a data delivery apparatus having a first secure area;
a data requesting apparatus having a second secure area; and
a data providing apparatus for providing delivery target data to the data delivery apparatus,
wherein the data delivery apparatus generates a pair of a first signature key and a first verification key in the first secure area and outputs the first verification key to an area outside the first secure area to publish the first verification key outside the data delivery apparatus, the data requesting apparatus generates a pair of a second signature key and a second verification key in the second secure area and outputs the second verification key to an area outside the second secure area to publish the second verification key outside the data requesting apparatus, the data delivery apparatus signs, in the first secure area, in response to a data delivery request from the data requesting apparatus, processing target data including at least part of the delivery target data using the first signature key and transmits transmission data obtained through the signing to the data requesting apparatus, the data requesting apparatus signs, in the second secure area, when the signature of the transmission data received from the data delivery apparatus is successfully verified using the first verification key, a verification result including identification information for identifying the processing target data using the second signature key and transmits certification data obtained through the signing to the data delivery apparatus, and the data delivery apparatus transmits, when the signature of the certification data received from the data requesting apparatus is successfully verified using the second verification key, the certification data to the data providing apparatus.

(Supplement C2)

The data delivery system according to supplement C1, wherein the data providing apparatus remits, when the signature of the certification data received from the data delivery apparatus is successfully verified using the second verification key, an amount of money corresponding to the certification data to the data delivery apparatus.

(Supplement C3)

The data delivery system according to supplement C1 or C2, wherein the data requesting apparatus generates an encryption key for data communication in the second secure area, outputs the encryption key to an area outside the second secure area, and transmits the encryption key to the data delivery apparatus, the data delivery apparatus encrypts, in response to a data delivery request, the processing target data in the first secure area using the encryption key acquired from the data delivery apparatus, and signs, in the first secure area, encrypted data obtained through the encryption using the first signature key, and transmits the signed encrypted data to the data requesting apparatus as the transmission data, and the data requesting apparatus decrypts, when the signature of the transmission data is successfully verified using the first verification key, the encrypted data included in the transmission data using a key based on the encryption key in the second secure area, signs, in the second secure area, the verification result including the identification information in decrypted data obtained through the decryption using the second signature key, and transmits the certification data obtained through the signing to the data delivery apparatus.

(Supplement C4)

The data delivery system according to supplement C3, wherein the data delivery apparatus calculates a hash value for the processing target data, and signs, in the first secure area, the encrypted data and the hash value using the first signature key, and transmits the signed encrypted data and hash value to the data requesting apparatus as the transmission data, and the data requesting apparatus calculates a verification hash value from the decrypted data, and when the hash value included in the transmission data and the verification hash value match, signs, in the second secure area, the verification result including the hash value as the identification information using the second signature key and transmits the signed verification result to the data delivery apparatus as the certification data.

(Supplement C5)

The data delivery system according to supplement C4, wherein the data delivery apparatus divides, in response to the data delivery request, the delivery target data into a plurality of chunks, calculates a hash value for each of the plurality of chunks, and encrypts each of the plurality of chunks in the first secure area using the encryption key, signs, in the first secure area, a pair of each piece of the encrypted data and a hash value corresponding to the piece of the encrypted data using the first signature key, and transmits the signed pair to the data requesting apparatus as the transmission data for each of the plurality of chunks, and the data requesting apparatus calculates, when the hash value included in the transmission data and the verification hash value match, a verified hash value using the hash value and a hash value prior to the hash value, and signs, in the second secure area, the verification result including the verified hash value as the identification information using the second signature key, and transmits the signed verification result to the data delivery apparatus as the certification data.

(Supplement C6)

The data delivery system according to supplement C5, wherein the data providing apparatus remits, when the signature of the certification data is successfully verified using the second verification key, an amount of money corresponding to the number of verified chunks to the data delivery apparatus.

(Supplement C7)

The data delivery system according to any one of supplements C1 to C6, wherein the data delivery apparatus publishes information of the first secure area and the first verification key by recording the information of the first secure area and the first verification key in a blockchain, the data requesting apparatus publishes information of the second secure area and the second verification key by recording the information of the second secure area and the second verification key in the blockchain and acquires at least the first verification key from the blockchain, and the data requesting apparatus and the data providing apparatus acquire at least the second verification key from the blockchain.

(Supplement C8)

The data delivery system according to any one of supplements C1 to C7, wherein the first secure area is a trusted execution environment (TEE) that is a more secure execution environment than an area outside the first secure area in the data delivery apparatus, and the second secure area is a TEE that is a more secure execution environment than an area outside the second secure area in the data requesting apparatus.

(Supplement D1)

A data delivery method, including:

by a computer, generating a pair of a first signature key and a first verification key in a first secure area of the computer;

outputting the first verification key to an area outside the first secure area in the computer;

publishing the output first verification key outside the computer;

acquiring a second verification key that is published out of a pair of a second signature key and the second verification key generated in a second secure area of a data requesting apparatus;

signing, in the first secure area, in response to a data delivery request from the data requesting apparatus, processing target data including at least part of delivery target data provided by a data providing apparatus using the first signature key;

transmitting transmission data obtained through the signing to the data requesting apparatus;

receiving, when the signature of the transmission data is successfully verified using the first verification key in the data requesting apparatus, certification data from the data requesting apparatus, the certification data being obtained by signing, in the second secure area, a verification result including identification information for identifying the processing target data using the second signature key;

verifying a signature of the certification data using the second verification key; and transmitting, when the signature of the certification data is successfully verified using the second verification key, the certification data to the data providing apparatus.

(Supplement E1)

A non-transitory computer readable medium storing a program causing a computer to execute:

generating a pair of a first signature key and a first verification key in a first secure area of the computer;

outputting the first verification key to an area outside the first secure area to publish the first verification key;

encrypting, in response to a data delivery request from a data requesting apparatus, processing target data in the first secure area using an encryption key to obtain encrypted data, the processing target data including at least part of delivery target data provided by a data providing apparatus, and the encryption key being generated as an encryption key for data communication in a second secure area of the data requesting apparatus and being input;

signing, in the first secure area, the encrypted data using the first signature key while using a second verification key that is published out of a pair of a second signature key and the second verification key generated in the second secure area of the data requesting apparatus; and outputting the signed encrypted data to an area outside the first secure area as transmission data to the data requesting apparatus.

(Supplement F1)

A data requesting method, including:

by a computer, acquiring a first verification key that is published out of a pair of a first signature key and the first verification key generated in a first secure area of a data delivery apparatus;

generating a pair of a second signature key and a second verification key in a second secure area of the computer;

outputting the second verification key to an area outside the second secure area in the computer;

publishing the output second verification key outside the computer;

requesting the data delivery apparatus to deliver delivery target data provided by a data providing apparatus;

receiving, from the data delivery apparatus, transmission data obtained by signing, in the first secure area in the data delivery apparatus, processing target data by using the first signature key, the processing target data including at least part of the delivery target data;

verifying a signature of the transmission data using the first verification key;

signing, in the second secure area, when the signature of the transmission data is successfully verified using the first verification key, a verification result including identification information for identifying the processing target data using the second signature key; and transmitting certification data obtained through the signing to the data delivery apparatus.

(Supplement G1)

A non-transitory computer readable medium storing a program causing a computer to execute:

generating a pair of a second signature key and a second verification key in a second secure area of the computer;

outputting the second verification key to an area outside the second secure area to publish the second verification key;

generating an encryption key for data communication in the second secure area;

outputting the encryption key to an area outside the second secure area to transmit the encryption key to a data delivery apparatus;

decrypting, when the signature of received data that is received from the data delivery apparatus is successfully verified using a first verification key that is published out of a pair of a first signature key and the first verification key generated in a first secure area of the data delivery apparatus, encrypted data included in the received data using a key based on the encryption key in the second secure area;

signing, in the second secure area, a verification result including identification information for identifying decrypted data obtained through the decryption using the second signature key; and outputting certification data obtained through the signing to an area outside the second secure area as reply data to the data delivery apparatus.

Although the present invention has been described above with reference to the example embodiments (and examples), the present invention is not limited to the above example embodiments (and examples). Various changes that can be understood by those skilled in the art can be made to the configurations and details of the present invention within the scope of the present invention.

REFERENCE SIGNS LIST

1000 Data delivery system
1 Data providing apparatus
11 Storage unit
111 Delivery target data
112 Second verification key
12 Providing unit
13 Receiving unit
14 Verification unit
15 Remittance processing unit
2 Data delivery apparatus
21 First secure area
201 First signature key
202 First verification key
203 Second verification key
211 Key generation unit
212 Output unit
213 Signing unit
22 Non-secure area
22a Non-secure area
221 Publishing unit
222 Acquiring unit
223 First transmitting unit
224 Receiving unit
225 Verification Unit
226 Second transmitting unit
3 Data requesting apparatus
31 Second secure area
301 Second signature key
302 Second verification key
303 First verification key
32 Non-secure area
32a Non-secure area
311 Key generation unit
312 Output unit
313 Signing unit
321 Publishing unit
322 Acquiring unit
323 Requesting unit
324 Receiving unit
325 Verification Unit
326 Transmitting unit
2000 Data delivery system
2a Data delivery apparatus
204 Encryption key
214 Encryption unit
227 Dividing unit
228 Calculation unit
229 Installation unit
23 Secure element
231 Control unit
232 Storage unit
2321 Secure program
233 IF unit
24 Non-secure element
241 Control unit
242 Storage unit
2421 Data delivery program
243 IF unit
244 Communication Unit
3a Data requesting apparatus
314 Decryption unit
304 Encryption key
305 Decryption key
327 Calculation unit
328 Installation unit
33 Secure element
331 Control unit
332 Storage unit
3321 Secure program
333 IF unit
34 Non-secure element
341 Control unit
342 Storage unit
3421 Data requesting program
343 IF unit
344 Communication Unit
4 Database
41 Delivery target data
5 Blockchain
N Network

What is claimed is:

1. A data delivery apparatus comprising:
a first secure area and a first non-secure area;
wherein the first secure area includes:
  at least one first memory storing first instructions, and
  at least one first processor configured to execute the first instructions to:
    generate a pair of a first signature key and a first verification key in the first secure area; and
    output the first verification key to an area outside the first secure area in the data delivery apparatus,
wherein the first non-secure area includes:
  at least one second memory storing second instructions, and
  at least one second processor configured to execute the second instructions to:
    install a secure program including the first instructions;
    publish an interface specification of the secure program outside the data delivery apparatus;
    publish the output first verification key outside the data delivery apparatus; and
    acquire a second verification key that has been published, the second verification key being part of a pair also including a second signature key, the pair having been generated in a second secure area of a data requesting apparatus,
wherein the at least one first processor is further configured to execute the first instructions to:
  sign, in the first secure area, in response to a data delivery request from the data requesting apparatus, processing target data using the first signature key, the processing target data including at least part of delivery target data provided by a data providing apparatus,
wherein the at least one second processor is further configured to execute the second instructions to:
  transmit transmission data obtained through signing of the processing target data, to the data requesting apparatus;
  receive, when a signature of the transmission data is successfully verified using the first verification key in the data requesting apparatus, certification data from the data requesting apparatus, the certification data being obtained by signing, in the second secure area, a verification result by using the second signature key, the verification result including identification information for identifying the processing target data;
  verify a signature of the certification data using the second verification key; and transmit, over a computer network and when the signature of the certification data is successfully verified using the second verification key, the certification data to the data providing apparatus, and wherein the data providing apparatus:
acquires the second verification key published by the data requesting apparatus;
receives the certification data received from the data delivery apparatus; and
verifies that the delivery target data was transmitted from the data delivery apparatus to the data requesting apparatus by verifying the signature of the certification data using the second verification key.

2. The data delivery apparatus according to claim 1, wherein the at least one second processor is further configured to execute the second instructions to:
acquire an encryption key for data communication generated in the second secure area in the data requesting apparatus, and
wherein the at least one first processor is further configured to execute the first instructions to:
encrypt the processing target data using the encryption key in the first secure area to obtain encrypted data; and
sign, in the first secure area, the encrypted data using the first signature key to obtain the transmission data.

3. The data delivery apparatus according to claim 2, wherein the at least one second processor is further configured to execute the second instructions to:
calculate a hash value for the processing target data, and
wherein the at least one first processor is further configured to execute the first instructions to:
sign, in the first secure area, the encrypted data and the hash value using the first signature key to obtain the transmission data.

4. The data delivery apparatus according to claim 3, wherein the at least one second processor is further configured to execute the second instructions to:
divide, in response to the data delivery request, the delivery target data into a plurality of chunks; and
calculate a hash value for each of the plurality of chunks,
wherein the at least one first processor is further configured to execute the first instructions to:
encrypt the plurality of chunks in the first secure area using the encryption key to respectively generate a plurality of pieces of the encrypted data; and
sign, in the first secure area, a pair of each piece of the encrypted data and a hash value corresponding to the piece of the encrypted data using the first signature key to obtain the transmission data for each of the plurality of chunks, and
wherein the at least one second processor is further configured to execute the second instructions to:
transmit to the data requesting apparatus the transmission data for each of the plurality of chunks.

5. The data delivery apparatus according to claim 4, wherein the at least one second processor is further configured to execute the second instructions to:
receive, when the signature of first transmission data corresponding to a first chunk is successfully verified using the first verification key in the data requesting apparatus, first certification data from the data requesting apparatus, the first certification data being obtained by signing, in the second secure area, a first verification result by using the second signature key, the first verification result including first identification information for identifying the first chunk; and
transmit, when a signature of the first certification data has been successfully verified using the second verification key, second transmission data corresponding to a second chunk to the data requesting apparatus.

6. The data delivery apparatus according to claim 1, wherein the at least one second processor is further configured to execute the second instructions to:
publish information of the first secure area and the first verification key by recording the information of the first secure area and the first verification key in a blockchain; and
acquire from the blockchain the second verification key that the data requesting apparatus has recorded in the blockchain.

7. The data delivery apparatus according to claim 1, wherein
the first secure area is a trusted execution environment (TEE) that is a more secure execution environment than an area outside the first secure area in the data delivery apparatus, and
the second secure area is a TEE that is a more secure execution environment than an area outside the second secure area in the data requesting apparatus.

8. The data delivery apparatus according to claim 1, wherein the data providing apparatus, when the signature of the certification data is successfully verified using the second verification key, remits a predetermined amount of money to the data delivery apparatus, the predetermined amount of money being an amount charged according to the delivery target data.

9. The data delivery apparatus according to claim 1, wherein the data delivery apparatus is a data distribution platform.

10. A data requesting apparatus comprising:
a second secure area and a second non-secure area;
wherein the second non-secure area includes:
at least one fourth memory configured to store fourth instructions, and
at least one fourth processor configured to execute the fourth instructions to:
acquire a first verification key that has been published, the first verification key being part of a pair also including a first signature key, the pair having been generated in a first secure area of a data delivery apparatus,
wherein the second secure area includes:
at least one third memory configured to store third instructions, and
at least one third processor configured to execute the third instructions to:
generate a pair of a second signature key and a second verification key in the second secure area; and
output the second verification key to an area outside the second secure area in the data requesting apparatus,
wherein the at least one fourth processor is further configured to execute the fourth instructions to:
install a secure program including the third instructions;
publish an interface specification of the secure program outside the data requesting apparatus;
publish the output second verification key;

request the data delivery apparatus, over a computer network, to deliver delivery target data provided by a data providing apparatus;

receive, from the data delivery apparatus, transmission data obtained by signing, in the first secure area, processing target data using the first signature key in the data delivery apparatus, the processing target data including at least part of the delivery target data; and verify a signature of the transmission data using the first verification key, wherein the at least one third processor is further configured to execute the third instructions to:

sign, in the second secure area, when the signature of the transmission data is successfully verified using the first verification key, a verification result using the second signature key, the verification result including identification information for identifying the processing target data, wherein the at least one fourth processor is further configured to execute the fourth instructions to:

transmit certification data obtained through signing of the verification result, to the data delivery apparatus, wherein the data delivery apparatus transmits, when the signature of the certification data received from the data requesting apparatus is successfully verified using the second verification key, the certification data to the data providing apparatus, and wherein the data providing apparatus:

acquires the second verification key published by the data requesting apparatus;

receives the certification data received from the data delivery apparatus; and verifies that the delivery target data was transmitted from the data delivery apparatus to the data requesting apparatus by verifying the signature of the certification data using the second verification key.

11. The data requesting apparatus according to claim 10, wherein the at least one third processor is further configured to execute the third instructions to:

generate an encryption key for data communication in the second secure area; and output the encryption key to an area outside the second secure area in the data requesting apparatus, wherein the at least one fourth processor is further configured to execute the fourth instructions to:

transmit the output encryption key to the data delivery apparatus; and receive, from the data delivery apparatus, the transmission data obtained by signing, in the first secure area, encrypted data using the first signature key, the encrypted data being obtained by encrypting the processing target data using the encryption key in the first secure area, and wherein the at least one third processor is further configured to execute the third instructions to:

decrypt, when the signature of the transmission data is successfully verified using the first verification key, the encrypted data included in the transmission data using a key based on the encryption key in the second secure area.

12. The data requesting apparatus according to claim 11, wherein the at least one fourth processor is further configured to execute the fourth instructions to:

receive the transmission data obtained by signing, in the first secure area, a hash value calculated for the processing target data and the encrypted data by using the first signature key;

calculate a verification hash value from the data decrypted from the encrypted data; and verify whether the hash value included in the transmission data and the verification hash value match, and wherein the at least one third processor is further configured to execute the third instructions to:

sign, in the second secure area, when the hash value included in the transmission data and the verification hash value match, the verification result including the hash value as the identification information using the second signature key to obtain the certification data.

13. The data requesting apparatus according to claim 12, wherein the at least one fourth processor is further configured to execute the fourth instructions to:

calculate, when the hash value included in the transmission data and the verification hash value match, a verified hash value using the hash value and a hash value included in transmission data prior to transmission of the transmission data, and wherein the at least one third processor is further configured to execute the third instructions to:

sign, in the second secure area, the verification result including the verified hash value as the identification information using the second signature key to obtain the certification data.

14. The data requesting apparatus according to claim 10, wherein the at least one fourth processor is further configured to execute the fourth instructions to:

publish information of the second secure area and the second verification key by recording the information of the second secure area and the second verification key in a blockchain; and acquire, from the blockchain, the first verification key that the data delivery apparatus has recorded in the blockchain.

15. The data requesting apparatus according to claim 10, wherein the first secure area is a trusted execution environment (TEE) that is a more secure execution environment than an area outside the first secure area in the data delivery apparatus, and the second secure area is a TEE that is a more secure execution environment than an area outside the second secure area in the data requesting apparatus.

16. A data delivery method, performed by a computer over a network, comprising:

installing a secure program;

publishing an interface specification of the secure program outside the computer;

generating a pair of a first signature key and a first verification key in a first secure area of the computer;

outputting the first verification key to an area outside the first secure area in the computer;

publishing the output first verification key outside the computer;

acquiring a second verification key that has been published, the second verification key being part of a pair also including a second signature key, the pair having been generated in a second secure area of a data requesting apparatus;

signing, in the first secure area, in response to a data delivery request from the data requesting apparatus, processing target data including at least part of delivery target data provided by a data providing apparatus using the first signature key;

transmitting transmission data obtained through signing of the processing target data to the data requesting apparatus;

receiving, when a signature of the transmission data is successfully verified using the first verification key in the data requesting apparatus, certification data from the data requesting apparatus, the certification data being obtained by signing, in the second secure area, a verification result including identification information for identifying the processing target data using the second signature key;

verifying a signature of the certification data using the second verification key; and transmitting, over the network and when the signature of the certification data is successfully verified using the second verification key, the certification data to the data providing apparatus, wherein the data providing apparatus:

acquires the second verification key published by the data requesting apparatus;

receives the certification data received from the computer; and verifies that the delivery target data was transmitted from the computer to the data requesting apparatus by verifying the signature of the certification data using the second verification key.

17. A non-transitory computer readable medium storing a program causing a computer, over a network, to execute:

installing a secure program;

publishing an interface specification of the secure program outside the computer;

generating a pair of a first signature key and a first verification key in a first secure area of the computer;

outputting the first verification key to an area outside the first secure area to publish the first verification key;

encrypting, in response to a data delivery request from a data requesting apparatus, processing target data in the first secure area using an encryption key to obtain encrypted data, the processing target data including at least part of delivery target data provided by a data providing apparatus, and the encryption key being generated as an encryption key for data communication in a second secure area of the data requesting apparatus and being input;

signing, in the first secure area, the encrypted data using the first signature key; and outputting the signed encrypted data to an area outside the first secure area as transmission data to the data requesting apparatus, wherein the data providing apparatus:

acquires, over the network, the second verification key published by the data requesting apparatus;

receives, over the network, certification data received from the computer; and verifies that the delivery target data was transmitted from the computer to the data requesting apparatus by verifying the signature of the certification data using the second verification key.

18. A data requesting method, performed by a computer over a network, comprising:

installing a secure program;

publishing an interface specification of the secure program outside the computer;

acquiring a first verification key that has been published, the first verification key being part of a pair also including a first signature key, the pair having been generated in a first secure area of a data delivery apparatus;

generating a pair of a second signature key and a second verification key in a second secure area of the computer;

outputting the second verification key to an area outside the second secure area in the computer;

publishing the output second verification key outside the computer;

requesting the data delivery apparatus to deliver delivery target data provided by a data providing apparatus;

receiving, from the data delivery apparatus, transmission data obtained by signing, in the first secure area in the data delivery apparatus, processing target data by using the first signature key, the processing target data including at least part of the delivery target data;

verifying a signature of the transmission data using the first verification key;

signing, in the second secure area, when the signature of the transmission data is successfully verified using the first verification key, a verification result including identification information for identifying the processing target data using the second signature key; and transmitting certification data obtained through the signing to the data delivery apparatus, wherein the data delivery apparatus transmits, over the network and when the signature of the certification data received from the computer is successfully verified using the second verification key, the certification data to the data providing apparatus, and wherein the data providing apparatus:

acquires the second verification key published by the computer;

receives the certification data received from the data delivery apparatus; and verifies that the delivery target data was transmitted from the data delivery apparatus to the computer by verifying the signature of the certification data using the second verification key.

\* \* \* \* \*